US012720553B2

(12) United States Patent
Lee et al.

(10) Patent No.: US 12,720,553 B2
(45) Date of Patent: Aug. 25, 2026

(54) METHOD AND DEVICE FOR PERFORMING UPLINK TRANSMISSION AND RECEPTION IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 18/707,426

(22) PCT Filed: Nov. 4, 2022

(86) PCT No.: PCT/KR2022/017285
§ 371 (c)(1),
(2) Date: May 3, 2024

(87) PCT Pub. No.: WO2023/080731
PCT Pub. Date: May 11, 2023

(65) Prior Publication Data

US 2026/0156645 A1 Jun. 4, 2026

(30) Foreign Application Priority Data

Nov. 4, 2021 (KR) ........................ 10-2021-0150817

(51) Int. Cl.
*H04W 72/21* (2023.01)
*H04L 1/1812* (2023.01)

(52) U.S. Cl.
CPC .......... *H04W 72/21* (2023.01); *H04L 1/1812* (2013.01)

(58) Field of Classification Search
CPC ............................ H04W 72/21; H04L 1/1812
See application file for complete search history.

(56) References Cited

U.S. PATENT DOCUMENTS

| | | | | |
|---|---|---|---|---|
| 2020/0374048 | A1 | 11/2020 | Lei et al. | |
| 2021/0243782 | A1* | 8/2021 | Miao | H04L 5/0091 |
| 2023/0299928 | A1* | 9/2023 | Ling | H04L 1/1861 370/329 |
| 2023/0379962 | A1* | 11/2023 | Andersson | H04W 72/02 |

(Continued)

FOREIGN PATENT DOCUMENTS

| | | |
|---|---|---|
| WO | WO 2020/261174 | 12/2020 |

OTHER PUBLICATIONS

Huawei, HiSilicon, CBN, "Mechanisms to improve reliability for RRC_CONNECTED Ues," R1-2108724, 3GPP TSG RAN WG1 Meeting #106bis-e, e-Meeting, Oct. 11-19, 2021, 7 pages.

(Continued)

*Primary Examiner* — Benjamin H Elliott, IV
(74) *Attorney, Agent, or Firm* — Fish & Richardson P.C.

(57) ABSTRACT

A method and device for performing uplink transmission and reception in a wireless communication system. A method for a terminal to perform uplink transmission may include the steps of: receiving information including a plurality of configurations for group-common SPS PDSCHs; receiving a plurality of group-common SPS PDSCHs based on the plurality of configurations; and transmitting information determined by multiplexing HARQ-ACK information for the plurality of group-common SPS PDSCHs on a specific PUCCH resource.

12 Claims, 10 Drawing Sheets

(56) References Cited

U.S. PATENT DOCUMENTS

2024/0089062 A1* 3/2024 Lin ........................ H04L 5/0044
2024/0348377 A1* 10/2024 Wang .................... H04L 1/1861

OTHER PUBLICATIONS

Lenovo, Motorola Mobility, "On reliability improvement for RRC_CONNECTED Ues," R1-2109539, 3GPP TSG RAN WG1 #106bis-e, e-Meeting, Oct. 11-19, 2021, 10 pages.
Moderator (Huawei), "FL summary#5 on improving reliability for MBS for RRC_CONNECTED Ues," R1-2104098, 3GPP TSG RAN WG1 Meeting #104bis-e, E-meeting, Apr. 12-20, 2021, 69 pages.
Office Action in Japanese Appln. No. 2024-525942, mailed on Jun. 17, 2025, 13 pages (with English translation).
Vivo, "Discussion on mechanisms to improve reliability for RRC_CONNECTED Ues," R1-2109002, 3GPP TSG RAN WG1 #106bis-e, e-Meeting, Oct. 11-19, 2021, 16 page.
International Search Report and Written Opinion in International Appln. No. PCT/KR2022/017285, mailed on Feb. 23, 2023, 8 pages (with partial English translation).
LG Electronics Inc., "Mechanisms to improve Reliability of Broadcast/Multicast service," 3GPP TSG RAN WG1, Meeting #106bis-e, R1-2109984, Online, Oct. 11-19, 2021, 13 pages.
LG Electronics Inc., "Support of group scheduling for RRC_CONNECTED UEs," 3GPP TSG RAN WG1, Meeting #106bis-e, R1-2109983, Online, Oct. 11-19, 2021, 12 pages.
LG Electronics Inc., Summary #2 on mechanisms to support group scheduling for RRC_CONNECTED Ues for NR MBS, 3GPP TSG RAN WG1, Meeting #106bis-e, R1-2110465, e-Meeting, Oct. 11-19, 2021, 99 pages.

* cited by examiner

METHOD AND DEVICE FOR PERFORMING UPLINK TRANSMISSION AND RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2022/017285, filed on Nov. 4, 2022, which claims the benefit of Korean Application No. 10-2021-0150817, filed on Nov. 4, 2021. The disclosures of the prior applications are incorporated by reference in their entirety.

TECHNICAL FIELD

The present disclosure relates to a wireless communication system, and in more detail, relates to an uplink transmission/reception method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide an uplink transmission/reception method and apparatus in a wireless communication system.

Additionally, an additional technical object of the present disclosure is to provide a method and apparatus for multiplexing HARQ-ACK information on multiple group common SPS PDSCHs.

The technical problems to be achieved by the present disclosure are not limited to the above-described technical objects, and other technical problems which are not described herein will be clearly understood by those skilled in the pertinent art from the following description.

According to an embodiment of the present disclosure, a method for performing uplink transmission by a terminal in a wireless communication system may comprise: receiving information including a plurality of configurations for a group common semi-persistent scheduling (SPS) physical downlink shared channel (PDSCH); receiving a plurality of group common SPS PDSCHs based on the plurality of configurations; and transmitting information determined by multiplexing Hybrid Automatic Repeat Request-Acknowledgement (HARQ-ACK) information for the plurality of group common SPS PDSCHs on a specific physical uplink control channel (PUCCH) resource. Based on the HARQ-ACK information being configured with a specific HARQ-ACK reporting mode, the HARQ-ACK information may be multiplexed by transforming to another HARQ-ACK reporting mode. Based a PUCCH configuration related to the HARQ-ACK information being not configured, the specific PUCCH resource may be determined based on another PUCCH configuration related to HARQ-ACK information for unicast SPS PDSCH.

As another embodiment of the present disclosure, a method for a base station to perform uplink reception in a wireless communication system may comprise: transmitting information including a plurality of configurations for a group common semi-persistent scheduling (SPS) physical downlink shared channel (PDSCH); transmitting a plurality of group common SPS PDSCHs based on the plurality of configurations; and receiving information in which Hybrid Automatic Repeat Request-Acknowledgement (HARQ-ACK) information for the plurality of group common SPS PDSCHs is multiplexed on a specific physical uplink control channel (PUCCH) resource. Based on the HARQ-ACK information being configured with a specific HARQ-ACK reporting mode, the HARQ-ACK information may be multiplexed by transforming to another HARQ-ACK reporting mode. Based a PUCCH configuration related to the HARQ-ACK information being not configured, the specific PUCCH resource may be determined based on another PUCCH configuration related to HARQ-ACK information for unicast SPS PDSCH.

Technical Effects

According to an embodiment of the present disclosure, an uplink transmission/reception method and apparatus may be provided in a wireless communication system.

According to an embodiment of the present disclosure, a method and apparatus for multiplexing HARQ-ACK information on a plurality of group common SPS PDSCHs may be provided.

According to an embodiment of the present disclosure, when NACK only-based HARQ-ACKs for a group common SPS PDSCH are transformed into ACK/NACK-based HARQ-ACKs and multiplexed, PUCCH resource determination for transmission of multiplexed HARQ-ACK information ambiguity may be removed.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
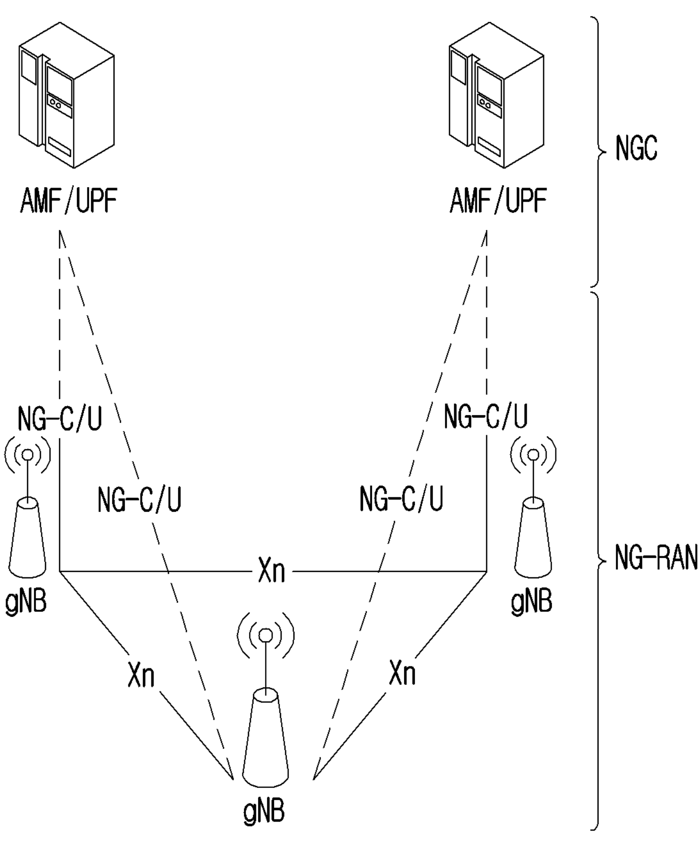
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. Abase station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information—reference signal resource indicator

CSI: channel state information

CSI-IM: channel state information—interference measurement

CSI-RS: channel state information—reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an $N_2$ interface, and is connected to a UPF (User Plane Function) through an $N_3$ interface.

Figure 2:
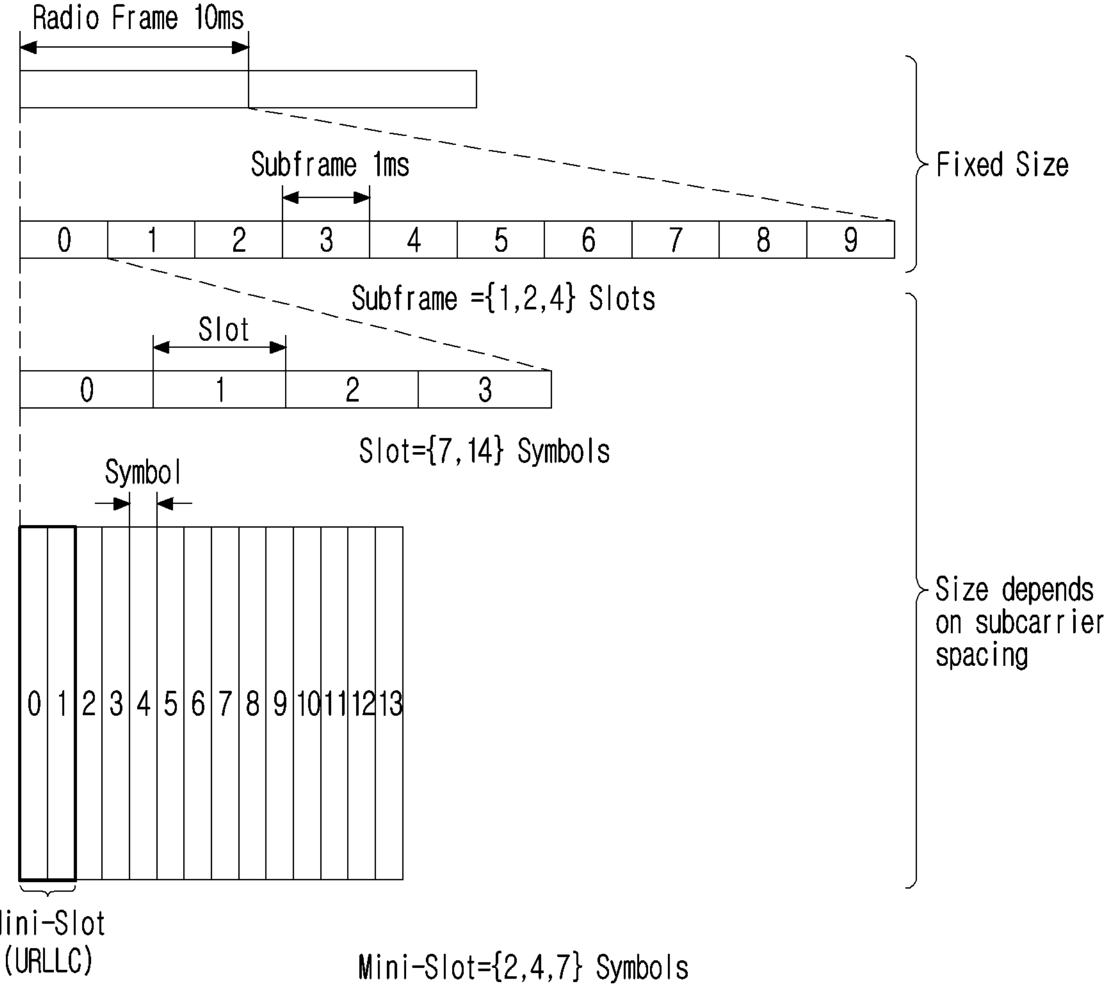
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^{\mu}\cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2, 4}slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
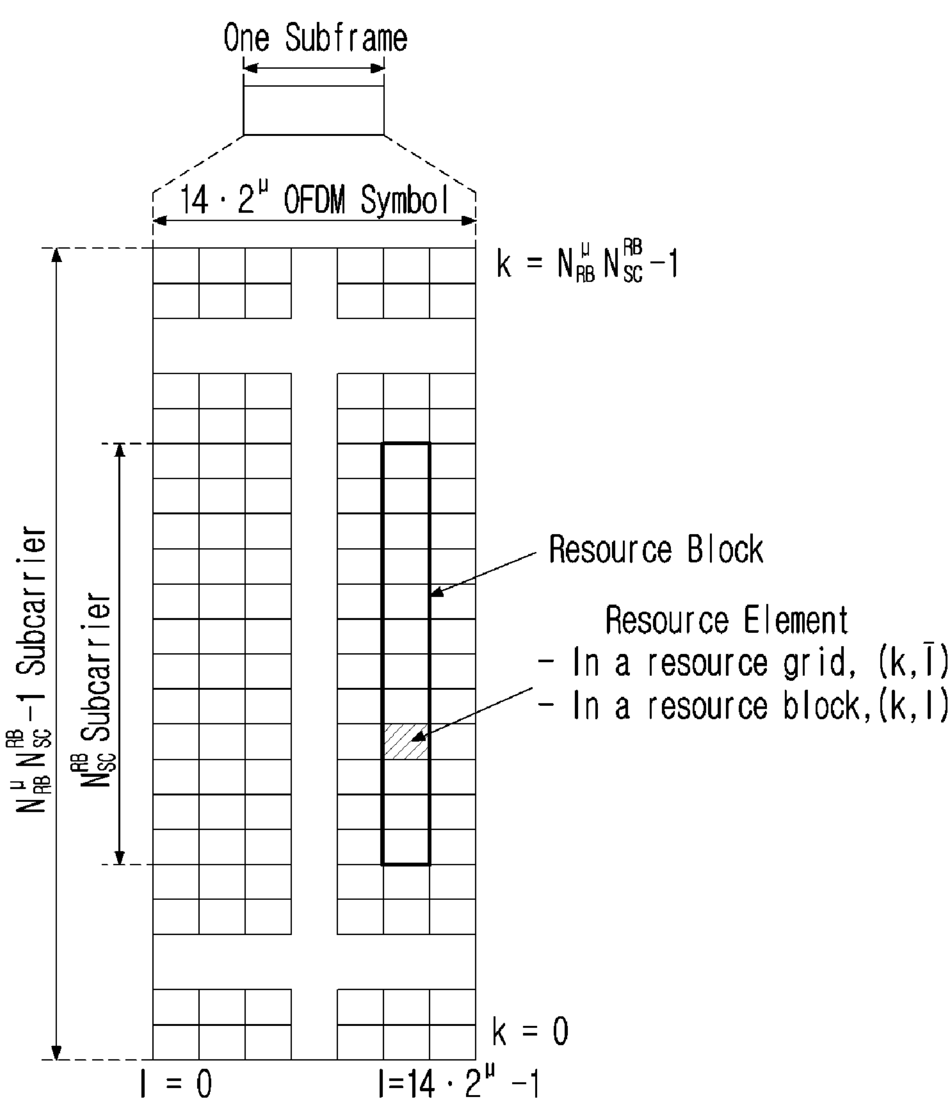
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for and an antenna port p corresponds to a complex value, $a_{k,l'}^{(p,\mu)}$. When there is no risk of confusion or when a specific antenna port or numerology is not specified, indexes p and may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
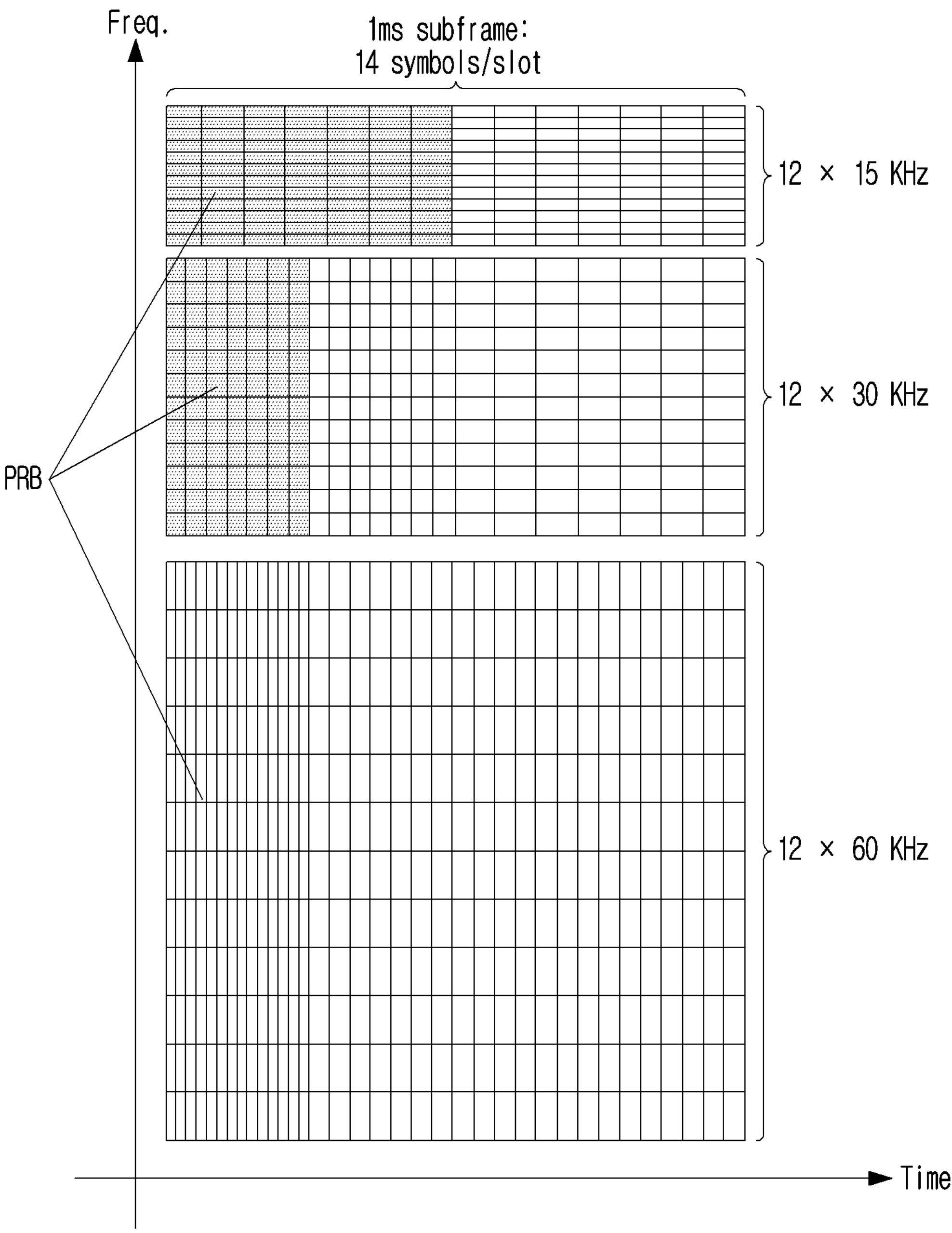
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
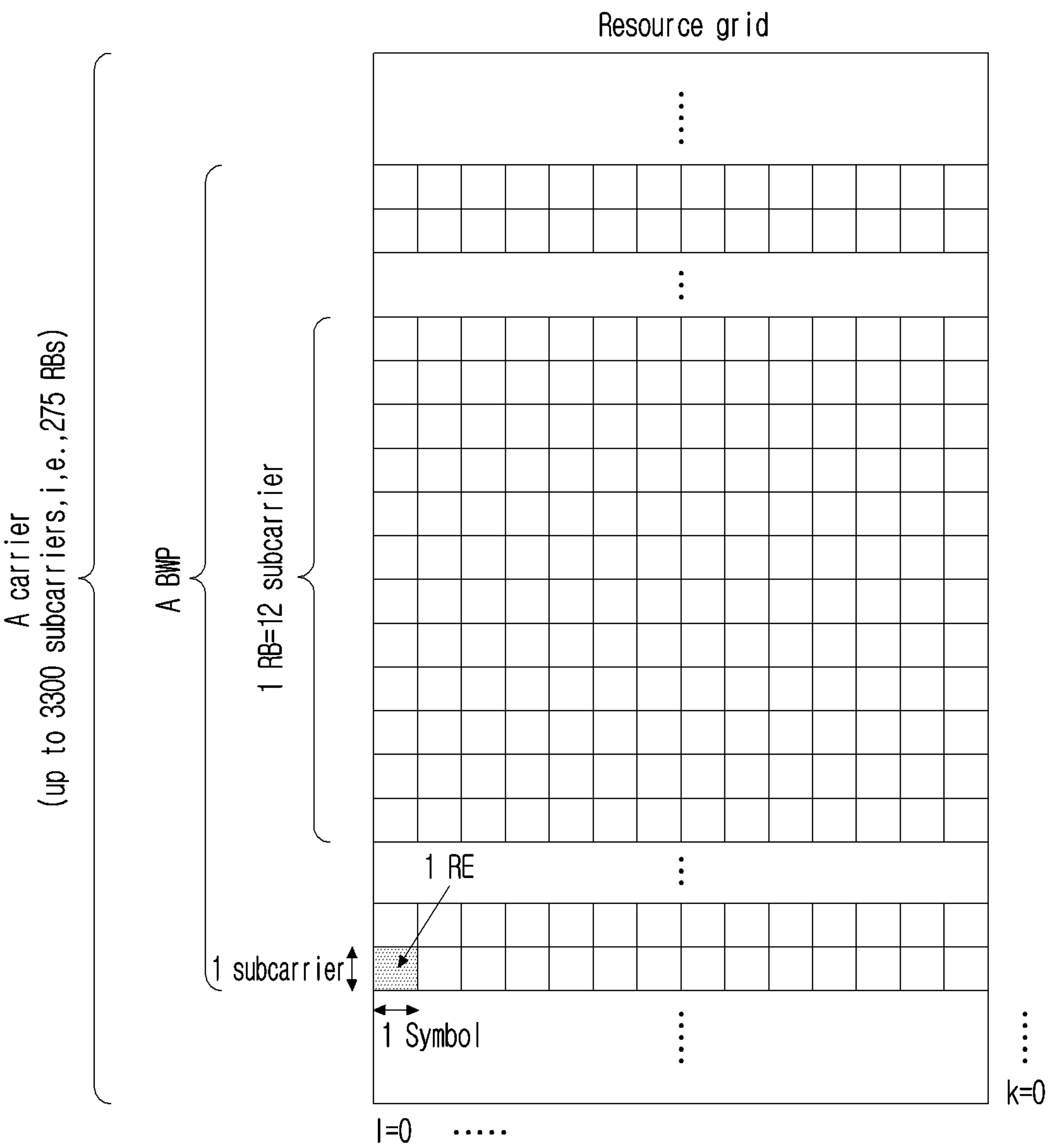
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
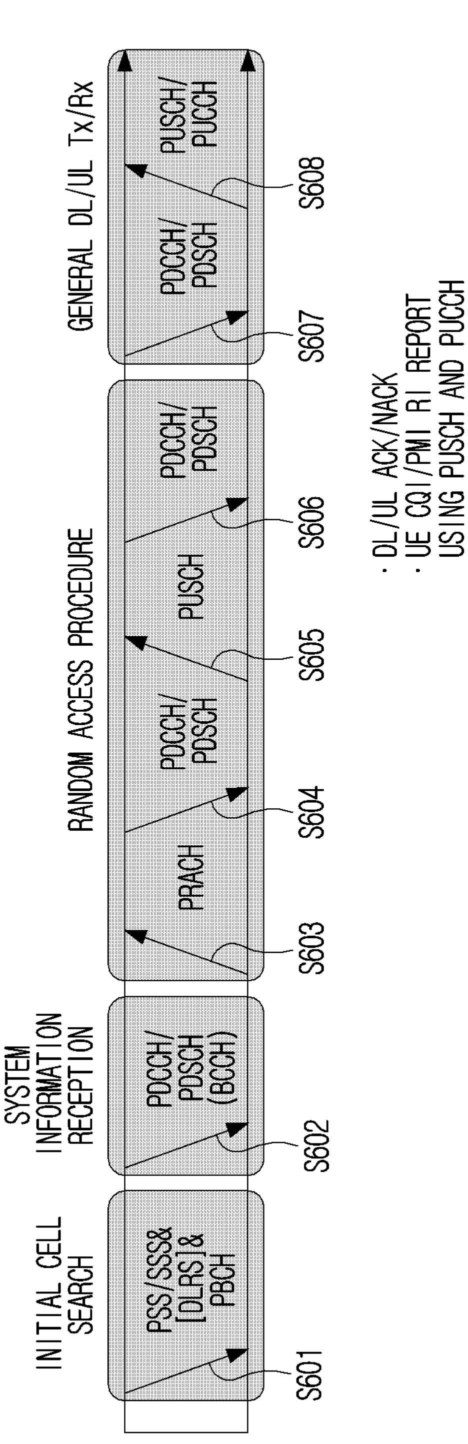
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 10, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast/Multicast Service) Scheme

Hereinafter, the MBMS scheme of 3GPP LTE will be described. MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

Here, SFN scheme may be used to provide a broadcast service to a wide area (e.g., MBMS area) through resources allocated semi-statically in advance, and SC-PTM scheme may be mainly used to provide a broadcast service only within a cell coverage through dynamic resources SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting SC-MCCH or SC-MTCH data may be scheduled through a PDCCH indicated by a Group Radio Network Temporary Identifier (G-RNTI).

In this case, a temporary mobile group identify (TMGI) corresponding to the service ID may be mapped one-to-one with a specific G (group)-RNTI value. Accordingly, when the base station provides a plurality of services, a plurality of G-RNTI values may be allocated for SC-PTM transmission. One or a plurality of terminals may perform PDCCH monitoring by using a specific G-RNTI to receive a specific service.

And, for a specific service/specific G-RNTI, SC-PTM dedicated DRX on-duration section may be configured, and in this case, the UEs may wake up only for a specific on-duration period and perform PDCCH monitoring for the G-RNTI.

MBS (Multicast Broadcast Service) Based Transmission/Reception Operation

The contents described below may be applied to PDCCH reception/PDSCH reception/PUCCH transmission for MBS in the serving cell, and the DCI format for scheduling PDSCH reception may be referred to as a multicast DCI format.

A UE may be provided one or more G-RNTIs for scrambling the CRC of multicast DCI formats for scheduling PDSCH receptions. The UE may be provided one G-CS-RNTI per SPS PDSCH configuration for scrambling the CRC of multicast DCI formats providing SPS PDSCH activation/release.

A UE may be configured by initialDownlinkBWP in DownlinkConfigCommonSIB a frequency resource for PDCCH and PDSCH receptions providing MCCH and MTCH (e.g., referring to 3GPP TS 38.331). If the UE is not provided initialDownlinkBWP, the frequency resource is same as for the CORESET with index 0 that is associated with the Type0-PDCCH CSS set.

Referring to a higher layer parameter value provided by PDCCH-ConfigCommon or PDSCH-ConfigCommon, if the higher layer parameter value is provided by PDCCH-Config or PDSCH-Config in cfr-Config-MCCH-MTCH, the latter value is used for PDCCH receptions or PDSCH receptions, respectively.

A UE may monitor PDCCH for scheduling PDSCH receptions for MCCH or MTCH (e.g., referring to 3GPP TS 38.213, clause 10.1).

A UE may be configured, per DL BWP by locationAnd-Bandwidth-Multicast, a frequency resource within the DL BWP for PDCCH and PDSCH receptions (e.g., referring to 3GPP TS 38.211).

Referring to a higher layer parameter value provided by PDCCH-Config or PDSCH-Config or SPS-Config, if the higher layer parameter value is provided by PDCCH-Config or PDSCH-Config or SPS-Config in cfr-Config-Multicast, the latter value is used for PDCCH receptions or PDSCH receptions, respectively.

Referring to a higher layer parameter value provided by a first or second PUCCH-Config, if the higher layer parameter value is provided by a first or second pucch-Config-Multicast1, or by a first or second pucch-Config-Multicast2, the latter value is used for PUCCH transmissions. In addition, referring to a higher layer parameter value provided by SPS-PUCCH-AN or SPS-PUCCH-AN-List, if the higher layer parameter value is provided by sps-PUCCH-AN-Multicast or by sps-PUCCH-AN-List-Multicast, respectively, the latter value is used for PUCCH transmissions. In addition, referring to a higher layer parameter value provided by pdsch-HARQ-ACK-Codebook or pdsch-HARQ-ACK-CodebookList, if the higher layer parameter value is provided by pdsch-HARQ-ACK-Codebook-Multicast or by pdsch-HARQ-ACK-CodebookList-Multicast, respectively, the latter value is used for PUCCH transmissions.

A UE monitors PDCCH for scheduling PDSCH receptions or for activation/release of SPS PDSCH receptions for a corresponding SPS PDSCH configuration (e.g., referring to 3GPP TS 38.213, clause 10.1).

If a UE is provided multiple G-RNTIs or G-CS-RNTIs, a configuration for a HARQ-ACK codebook type applies to all G-RNTIs or G-CS-RNTIs.

A UE indicating a capability to support first HARQ-ACK reporting mode and second HARQ-ACK reporting mode, may be configured by harq-Feedback-Option-Multicast to provide HARQ-ACK information for a transport block reception according to the first HARQ-ACK reporting mode or according to the HARQ-ACK second reporting mode. The second HARQ-ACK reporting mode is not applicable for DCI formats having associated HARQ-ACK information without scheduling a PDSCH reception.

For the first HARQ-ACK reporting mode, the UE generates HARQ-ACK information with ACK value when a UE correctly decodes a transport block of detects a DCI format indicating an SPS PDSCH activation/release. Otherwise, the UE generates HARQ-ACK information with NACK value, (e.g., referring to 3GPP TS 38.213, clauses 9 and 9.1 through 9.3).

For the second HARQ-ACK reporting mode, the UE does not transmit a PUCCH that would include only HARQ-ACK information with ACK values.

In relation to the methods proposed in the present disclosure, ACK/NACK-based HARQ-ACK may mean HARQ-ACK feedback/information/bit determined according to the first HARQ-ACK reporting mode. Additionally, NACK only based HARQ-ACK may mean HARQ-ACK feedback/information/bit determined according to the second HARQ-ACK reporting mode.

A PDSCH reception providing an initial transmission of a TB is scheduled only by a multicast DCI format. For the first HARQ-ACK reporting mode, a PDSCH reception providing a retransmission of the TB may be scheduled either by a multicast DCI format or by a unicast DCI format (e.g., referring to 3GPP TS 38.214).

An activation or a release for SPS PDSCH receptions using a G-CS-RNTI for a corresponding SPS PDSCH configuration is provided by a multicast DCI format (e.g., referring to 3GPP TS 38.213, in clause 10.2) by replacing CS-RNTI with the G-CS-RNTI. For the first HARQ-ACK reporting mode and for a TB that a UE received in a SPS PDSCH, a PDSCH reception providing a retransmission of the TB may be scheduled either by a unicast DCI format or by a multicast DCI format (e.g., referring to 3GPP TS 38.214).

For the first HARQ-ACK reporting mode, a UE may be configured per G-RNTI to provide HARQ-ACK information by harq-FeedbackEnabler-Multicast. When the UE is not provided harq-FeedbackEnabler-Multicast for a G-RNTI, the UE does not provide HARQ-ACK information associated with the G-RNTI. When the UE indicates a capability for not generating HARQ-ACK information associated with a multicast DCI format and is provided harq-FeedbackEnabler-Multicast, the UE determines whether or not to provide the HARQ-ACK information based on an indication by the multicast DCI format.

For the second HARQ-ACK reporting mode, if a UE would multiplex HARQ-ACK information associated with multicast DCI formats and HARQ-ACK information associated with unicast DCI formats in a PUCCH, or with P/SP-CSI in a PUCCH, or in a PUSCH, the UE provides HARQ-ACK information according to the first HARQ-ACK reporting mode.

If a UE is provided pdsch-HARQ-ACK-Codebook=semi-static, the UE may generate a Type-1 HARQ-ACK codebook based on a pre-defined method (e.g., referring to 3GPP TS 38.213, clauses 9.1.2 and 9.1.2.1.). If a UE is provided pdsch-HARQ-ACK-Codebook=dynamic, the UE may generate a Type-2 HARQ-ACK codebook based on a pre-defined method (e.g., referring to 3GPP TS 38.213, clause 9.1.3.1).

A UE determines a PUCCH resource for a PUCCH transmission with HARQ-ACK information based on a pre-defined method (e.g., referring to 3GPP TS 38.213, clauses 9.2 and 9.2.1 through 9.2.5). If the UE multiplexes HARQ-ACK information associated with unicast DCI formats and HARQ-ACK information associated with multicast DCI formats in a same PUCCH, the last DCI format that the UE uses to determine the PUCCH resource, may corresponds to a last unicast DCI format (e.g., referring to 3GPP TS 38.213, clause 9.2.3).

As described above, in the existing NR wireless communication system, the base station sets terminal-specific SPS (semi-persistent scheduling) configuration information to a specific terminal, so that a downlink (DL) SPS transmission resource that is repeated according to a configured period may be allocated to a specific terminal. In this case, the DCI transmitted through the terminal-dedicated PDCCH indicates activation of a specific SPS configuration index (SPS activation), thereby instructing the corresponding terminal to repeatedly receive the SPS transmission resource according to a configured period.

This initial SPS transmission resource may be used for initial HARQ transmission, and the base station may allocate a retransmission resource of a specific SPS configuration index through DCI transmitted through a terminal-dedicated PDCCH. For example, when the terminal reports a HARQ negative acknowledgment (NACK) for the SPS transmission resource, the base station may allocate the retransmission resource to DCI so that the terminal may receive the DL retransmission.

And, the DCI transmitted through the terminal-only PDCCH may indicate deactivation (SPS release or SPS deactivation) of a specific SPS configuration index, and in this case, the corresponding terminal may not receive the indicated SPS transmission resource. Here, the CRC of the DCI for the activation/retransmission/deactivation may be scrambled with a CS-RNTI (Configured Scheduling RNTI).

In a wireless communication system (e.g., NR), a DL broadcast or DL multicast transmission scheme for supporting an MBS similar to the above-described MBMS may be applied. The base station may provide a point-to-multipoint (PTM) transmission scheme and a point-to-point (PTP) transmission scheme for DL broadcast or DL multicast transmission.

In the PTM transmission method for MBS, the base station may transmit a group common PDCCH and a group common PDSCH to a plurality of terminals, and a plurality of terminals may simultaneously receive the same group common PDCCH and group common PDSCH transmission and decode the same MBS data.

In addition, in the PTP transmission method for MBS, the base station may transmit the terminal-dedicated PDCCH and the terminal-dedicated PDSCH to a specific terminal, and only the corresponding terminal may receive the terminal-dedicated PDCCH and the terminal-dedicated PDSCH. Here, when there are a plurality of terminals receiving the same MBS service, the base station may separately transmit the same MBS data to individual terminals through different terminal-dedicated PDCCHs and terminal-dedicated PDSCHs.

For application of MBS, group common SPS transmission may be supported. Accordingly, the terminal may receive group common SPS transmission (i.e., static scheduling transmission) and group common dynamic scheduling transmission (dynamically scheduled transmission). In addition, the terminal may receive a group common SPS transmission and a static/dynamic scheduling transmission dedicated to the terminal. In this case, the UE may transmit the HARQ-ACK for the transmissions in the same slot or sub-slot.

For example, PUCCH resource(s) for group common/UE-dedicated SPS and PUCCH resource(s) for group common/UE-dedicated dynamic scheduling transmission may be allocated to the same slot or the same sub-slot. In HARQ-ACK transmission for two or more transmissions as described above, if multiple PUCCH resources are allocated to the same slot/sub-slot and the terminal may not perform multiple PUCCH transmission, the UE may multiplex HARQ-ACKs for multiple transmissions on one PUCCH resource among multiple PUCCH resources and transmit it.

However, in the conventional method, when HARQ-ACKs are transmitted in the same slot/sub-slot for a plurality of group common transmissions or a plurality of group common/UE-dedicated transmissions, there is a problem that the standards/rules for selecting PUCCH resources are not clear.

Method of HARQ-ACK Multiplexing and Transmission Resource Determination for Multiple Group Common Transmission and/or UE-Dedicated Transmission In order to solve the above-described problem, in the present disclosure, when HARQ-ACKs for multiple group common transmissions or multiple group common/UE-dedicated transmissions are transmitted in the same slot/subslot, a method of selecting one PUCCH resource and multiplexing the corresponding HARQ-ACKs will be explained.

Hereinafter, in the present disclosure, group common transmission means multicast-based transmission and/or broadcast-based transmission, and UE-specific transmission means unicast-based transmission and the above-described UE-dedicated transmission.

For example, when a PUCCH resource for HARQ-ACK for multiple SPS PDSCH for MBS purpose (i.e., group common SPS PDSCH) and a PUCCH resource for scheduling request (SR) are allocated to the same slot, the UE may multiplex HARQ-ACK and SR and transmit it through a specific PUCCH resource. At this time, the specific PUCCH resource may be selected as the PUCCH resource for the SPS PDSCH for MBS purpose.

Alternatively, when a PUCCH resource for HARQ-ACK and a PUCCH resource for SR for multiple SPS PDSCH for MBS purposes (i.e., group common SPS PDSCH) are allocated to the same slot, the UE may transmit only PUCCH for HARQ-ACK for SPS PDSCH and drop PUCCH for SR. Alternatively, in this case, the UE may drop the PUCCH for HARQ-ACK for the SPS PDSCH and transmit the PUCCH for SR.

As another example, when a PUCCH resource for HARQ-ACK for SPS PDSCH for MBS purposes (i.e., group common SPS PDSCH) and a PUCCH resource for HARQ-ACK for unicast PDSCH (i.e., UE-specific SPS PDSCH) are allocated to the same slot, the UE may construct/determine the HARQ-ACK codebook/information by multiplexing the HARQ-ACK for the SPS PDSCH for MBS purposes and the HARQ-ACK for the unicast PDSCH. At this time, the UE may transmit the HARQ-ACK codebook/information by selecting a PUCCH resource according to the PUCCH configuration for unicast (e.g., PUCCH-config) (or according to the PUCCH configuration for multicast).

Alternatively, when a PUCCH resource for HARQ-ACK for SPS PDSCH for MBS purposes and a PUCCH resource for HARQ-ACK for unicast PDSCH are allocated to the same slot, the UE may drop HARQ-ACK for the SPS PDSCH and transmit PUCCH for HARQ-ACK for the unicast PDSCH. Alternatively, in this case, the UE may transmit PUCCH for HARQ-ACK for SPS PDSCH and drop HARQ-ACK for unicast PDSCH.

For another example, when the PUCCH resource for HARQ-ACK for SPS PDSCH for MBS use, the PUCCH resource for HARQ-ACK for unicast PDSCH, and the PUCCH resource for SR are allocated to the same slot, the UE may construct/determine the HARQ-ACK codebook/information by multiplexing HARQ-ACK for SPS PDSCH for MBS purposes, HARQ-ACK and SR for unicast PDSCH. At this time, the UE may transmit the HARQ-ACK codebook/information by selecting a PUCCH resource according to the PUCCH configuration for unicast (e.g., PUCCH-config) (or according to the PUCCH configuration for multicast).

Alternatively, when the PUCCH resource for HARQ-ACK for SPS PDSCH for MBS purposes, the PUCCH resource for HARQ-ACK for unicast PDSCH, and the PUCCH resource for SR are allocated to the same slot, the UE may drop the HARQ-ACK for the SPS PDSCH for MBS purposes and transmit the PUCCH by multiplexing the HARQ-ACK and SR for the unicast PDSCH. Alternatively, in this case, the UE may transmit PUCCH for HARQ-ACK for the SPS PDSCH for MBS purposes and drop HARQ-ACK and SR for the unicast PDSCH. Alternatively, in this case, the UE may transmit PUCCH by multiplexing HARQ-ACK and SR for SPS PDSCH for MBS purposes and drop HARQ-ACK for unicast PDSCH.

Additionally, with respect to the methods described in the present disclosure below, an example of a PUCCH resource selection method for multiplexing HARQ-ACKs for (general) multiple SPS PDSCHs may be shown in Table 6 below (e.g., referring to 3GPP TS 38.213 clause 9.2.1).

TABLE 6

| 3GPP TS 38.213 clause 9.2.1 |
|---|
| If the UE is provided SPS-PUCCH-AN-List and transmits $O_{UCI}$ UCI information bits that include only HARQ-ACK information bits in response to one or more SPS PDSCH receptions and SR, if any, the UE determines a PUCCH resource as below. |
| - A PUCCH resource is provided by sps-PUCCH-AN-ResourceID obtained from the first entry in sps-PUCCH-AN-List if $O_{UCI} \leq 2$ including 1 or 2 HARQ-ACK information bits and a positive or negative SR on one SR transmission occasion if transmission of HARQ-ACK information and SR occurs simultaneously. |
| - A PUCCH resource is provided by sps-PUCCH-AN-ResourceID obtained from the second entry in sps-PUCCH-AN-List, if provided, if $2 < O_{UCI} \leq N_{1,SPS}$ where $N_{1,SPS}$ is either provided by maxPayloadSize obtained from the second entry in sps-PUCCH-AN-List or is otherwise equal to 1706. |
| - A PUCCH resource is provided by sps-PUCCH-AN-ResourceID obtained from the third entry in sps-PUCCH-AN-List, if provided, if $N_{1,SPS} < O_{UCI} \leq N_{2,SPS}$ where $N_{2,SPS}$ is either provided by maxPayloadSize obtained from the third entry in sps-PUCCH-AN-List or is otherwise equal to 1706. |
| - A PUCCH resource is provided by sps-PUCCH-AN-ResourceID obtained from the fourth entry in sps-PUCCH-AN-List, if provided, if $N_{2,SPS} < O_{UCI} \leq N_{3,SPS}$ where $N_{3,SPS}$ is equal to 1706. |

In relation to Table 6, SPS-PUCCH-AN and SPS-PUCCH-AN-List may be included and configured in PUCCH configuration (e.g., PUCCH-config) as shown in Table 7 below. In Table 7, the PUCCH settings may be PUCCH configuration for HARQ-ACK transmission for SPS purposes.

TABLE 7

```
SPS-PUCCH-AN-List-r16 ::= SEQUENCE (SIZE(1..4)) OF SPS-PUCCH-AN-r16
SPS-PUCCH-AN-r16 ::= SEQUENCE {
sps-PUCCH-AN-ResourceID-r16 PUCCH-ResourceId,
maxPayloadSize-r16 INTEGER (4..256) OPTIONAL -- Need R
}
```

In relation to Table 7, the SPS-PUCCH-AN-List information element (IE) may be used to set a list of PUCCH resources for each HARQ-ACK codebook. SPS-PUCCH-AN IE may be used to indicate a PUCCH resource for HARQ-ACK and set the corresponding maximum payload size for the PUCCH resource.

Hereinafter, in the present disclosure, When HARQ-ACKs for multiple group common transmissions, or group common transmission/UE-dedicated transmission/SR, etc. are transmitted in the same slot/sub-slot, methods for selecting one PUCCH resource and multiplexing the corresponding HARQ-ACKs will be described.

In the following methods, with respect to HARQ-ACK for multicast PDSCH, NACK only based HARQ-ACK/HARQ-ACK feedback may correspond to HARQ-ACK information/bit(s) according to the first HARQ-ACK reporting mode described above. Additionally, ACK/NACK-based HARQ-ACK/HARQ-ACK feedback may correspond to HARQ-ACK information/bit(s) according to the second HARQ-ACK reporting mode described above.

Additionally, in the following ways: Multicast PDSCH may mean a group common PDSCH scheduled by a group common PDCCH, and unicast PDSCH may mean a UE-specific PDSCH scheduled by a UE-specific PDCCH. In addition, HARQ-ACK feedback for multicast may mean HARQ-ACK feedback for multicast PDSCH, and HARQ-ACK feedback for unicast may mean HARQ-ACK feedback for unicast PDSCH.

Embodiment 1

This embodiment relates to a PUCCH resource determination method in the case of multiplexing NACK only-based HARQ-ACK for multicast PDSCH(s) and unicast HARQ-ACK for unicast PDSCH.

For example, when a PUCCH resource carrying the NACK only-based HARQ-ACK feedback for multicast and a PUCCH resource carrying ACK/NACK-based HARQ-ACK feedback for unicast are allocated in a same UL slot, the UE may multiplex the NACK only-based HARQ-ACK feedback for multicast and ACK/NACK-based HARQ-ACK feedback for unicast in one PUCCH resource.

For multiplexing the NACK only-based HARQ-ACK feedback for multicast and ACK/NACK-based HARQ-ACK feedback for unicast, the UE may determine the PUCCH resources for transmission based on the PUCCH Resource Indicator (PRI) indicated in the last DCI. Herein, the last DCI may refer to the last received DCI (i.e., the most recently received DCI) for unicast.

In multiplexing as described above, NACK only-based HARQ-ACK feedback may be transformed to ACK/NACK-based HARQ-ACK feedback.

Embodiment 2

This embodiment relates to a PUCCH resource determination method in the case of multiplexing NACK only-based HARQ-ACK and multicast ACK/NACK-based HARQ-ACK for multicast PDSCH(s).

In here, multicast ACK/NACK-based HARQ-ACK may correspond to ACK/NACK-based HARQ-ACK for multicast PDSCH.

For example, when a PUCCH resource carrying the NACK only-based HARQ-ACK feedback for multicast and a PUCCH resource carrying ACK/NACK-based HARQ-ACK feedback for multicast are allocated in a same UL slot, the UE may multiplex the NACK only-based HARQ-ACK feedback for multicast and ACK/NACK-based HARQ-ACK feedback for multicast in one PUCCH resource.

For multiplexing the NACK only-based HARQ-ACK feedback for multicast and ACK/NACK-based HARQ-ACK feedback for multicast, the UE may determine the PUCCH resources for transmission based on the PRI indicated in the last DCI. Herein, the last DCI may refer to the last received DCI indicating PRI for ACK/NACK-based HARQ-ACK feedback for multicast.

In multiplexing as described above, NACK only-based HARQ-ACK feedback may be transformed to ACK/NACK-based HARQ-ACK feedback.

Embodiment 3

This embodiment relates to a PUCCH resource determination method in the case of multiplexing HARQ-ACKs for dynamically scheduled multicast PDSCH and unicast SPS PDSCH.

In here, the dynamically scheduled multicast PDSCH may mean a PDSCH scheduled based on the DCI format for multicast purposes.

For example, when a PUCCH resource carrying HARQ-ACK feedback for multicast and a PUCCH resource carrying HARQ-ACK feedback for unicast Semi-Persistent Scheduling (SPS) are allocated in a same UL slot, the UE may multiplex HARQ-ACK feedback for multicast and HARQ-ACK feedback for unicast SPS PDSCH in one PUCCH resource.

For multiplexing HARQ-ACKs for dynamically scheduled multicast PDSCH and unicast SPS PDSCH, the UE may determine a PUCCH resource based on one of the following examples. As an example, a PUCCH resource may be determined based on the PRI indicated by the last received DCI, which dynamically schedules the multicast PDSCH. As another example, a PUCCH resource may be determined based on a PUCCH resource for HARQ-ACK for unicast SPS PDSCH.

For another example, when a PUCCH resource carrying HARQ-ACK feedback for multicast and a PUCCH resource carrying HARQ-ACK feedback for unicast SPS are allocated in the same UL slot, the UE may drop HARQ-ACK for multicast while transmitting HARQ-ACK to unicast SPS PDSCH.

For another example, when a PUCCH resource carrying HARQ-ACK feedback for multicast and a PUCCH resource carrying HARQ-ACK feedback for unicast SPS are allocated in the same UL slot, if the HARQ-ACK for multicast is based on NACK only-based HARQ-ACK, the UE may drop the HARQ-ACK for multicast.

At this time, if the HARQ-ACK for multicast is based on ACK/NACK-based HARQ-ACK, the UE may multiplex the HARQ-ACK feedback for multicast and the HARQ-ACK feedback for unicast SPS PDSCH in one PUCCH resource. Alternatively, if the HARQ-ACK for multicast is based on ACK/NACK-based HARQ-ACK, the UE may drop HARQ-ACK for unicast.

The UE may perform an operation of the corresponding example regardless of whether HARQ-ACK for multicast and HARQ-ACK to unicast SPS PDSCH have a same priority or different priorities. Alternatively, the UE may perform an operation of the corresponding example when HARQ-ACK for multicast and HARQ-ACK to unicast SPS PDSCH have a same priority while performing an operation in the example described later when they have different priorities.

As an example, when a PUCCH resource carrying HARQ-ACK feedback for multicast and a PUCCH resource carrying HARQ-ACK feedback for unicast SPS are allocated in the same UL slot, the UE may transmit HARQ-ACK with high priority, while dropping HARQ-ACK with low priority. HARQ-ACK with low priority may be set to low priority by an RRC message, or may be either HARQ-ACK for multicast or HARQ-ACK for unicast SPS PDSCH, which is set to low priority by DCI.

For another example, when a PUCCH resource carrying HARQ-ACK feedback for multicast and a PUCCH resource carrying HARQ-ACK feedback for unicast SPS are allocated in the same UL slot, the UE may drop the HARQ-ACK for the unicast SPS PDSCH, while transmitting the HARQ-ACK for the multicast based on the PRI indicated by the last received DCI for the multicast.

Embodiment 4

This embodiment relates to a PUCCH resource determination method in the case of multiplexing HARQ-ACKs for multicast SPS PDSCH and dynamically scheduled multicast PDSCH.

Here, the dynamically scheduled multicast PDSCH may mean a PDSCH scheduled based on the DCI format for multicast purposes.

For example, if a PUCCH resource carrying HARQ-ACK feedback for the multicast PDSCH scheduled by the multicast DCI and a PUCCH resource carrying HARQ-ACK feedback for the group common SPS PDSCH are allocated in the same UL slot, the UE may multiplex HARQ-ACK feedback for the multicast PDSCH and HARQ-ACK feedback for the group common SPS PDSCH in one PUCCH resource.

In multiplexing HARQ-ACKs for the dynamically scheduled multicast PDSCH and multicast SPS PDSCH, the UE may determine the PUCCH resource based on the last received DCI for dynamically scheduling the multicast PDSCH.

Embodiment 5

This embodiment relates to a PUCCH resource determination method in the case of multiplexing HARQ-ACKs for multicast SPS PDSCHs.

For example, when PUCCH resources carrying HARQ-ACK feedbacks for group common SPS (e.g., multicast SPS) PDSCHs are allocated in a same UL slot, the UE may multiplex HARQ-ACK feedbacks for group common SPS PDSCHs in one PUCCH resource.

In multiplexing HARQ-ACK feedbacks for group common SPS PDSCHs, (referring to the method in Table 6 above), the UE may determine the PUCCH resource based on SPS PUCCH ACK/NACK related list information (e.g., sps-PUCCH-AN-List) in the PUCCH configuration (e.g., PUCCH-config) for multicast.

In this regard, when PUCCH configuration for multicast is not configured/provided, PUCCH configuration for unicast may be used. As a detailed example, if the SPS PUCCH ACK/NACK related list information (e.g., sps-PUCCH-AN-ListMulticast) in the PUCCH configuration for multicast is not configured, SPS PUCCH ACK/NACK-related list information (e.g., sps-PUCCH-AN-List) in PUCCH configuration for unicast may be used to determine PUCCH resources.

Additionally/alternatively, when a scheduling request (SR) is multiplexed with HARQ-ACK feedbacks for group common SPS PDSCHs, (referring to the method in Table 6 above), the UE may determine the PUCCH resource based on the SPS PUCCH ACK/NACK related list information (e.g., sps-PUCCH-AN-List) in the PUCCH configuration for unicast. It may be assumed that the PUCCH configuration for unicast may accommodate the group common SPS PDSCH. Alternatively, if SR is multiplexed with HARQ-ACK feedbacks for group common SPS PDSCHs, (if PUCCH configuration for unicast is used) ACK/NACK-based HARQ-ACKs for group common SPS PDSCHs are dropped, while SR may be transmitted. Alternatively, if SR is multiplexed with HARQ-ACK feedbacks for group common SPS PDSCHs, (if PUCCH configuration for unicast is used) ACK/NACK-based HARQ-ACKs for group common SPS PDSCHs are transmitted, while SR may be dropped.

Additionally/alternatively, when NACK only-based HARQ-ACK(s) is configured for some/all of HARQ-ACK(s) for group common SPS PDSCHs, NACK only-based HARQ-ACK(s) may be transformed to ACK/NACK-based HARQ-ACK(s) for multiplexing HARQ-ACKs for group common SPS PDSCHs in one PUCCH resource.

Alternatively, for multiplexing N NACK only-based HARQ-ACK(s) for N group common SPS PDSCH, if the PUCCH configuration includes SPS-specific PUCCH resources for NACK only-based HARQ-ACK and NACK only-based HARQ-ACK is configured for N group common SPS PDSCH, the UE may operate according to at least one of the following examples.

As an example, if the threshold is less than or equal to N, NACK only-based HARQ-ACK(s) can be transformed to ACK/NACK-based HARQ-ACK(s) for multiplexing HARQ-ACKs for group common SPS PDSCHs in one PUCCH resource.

As another example, if the threshold is greater than N, the UE may select a PUCCH resource corresponding to a combination of NACK only-based HARQ-ACK values for N SPS PDSCHs among multiple PUCCH resources. Alternatively, if the threshold is greater than N, the UE may select a PUCCH sequence corresponding to a combination of NACK only-based HARQ-ACK values for N SPS PDSCHs. The UE may select a PUCCH resource for the SPS PDSCH with the lowest SPS configuration index among the N group common SPS PDSCHs.

Embodiment 6

This embodiment relates to a PUCCH resource determination method in the case of multiplexing HARQ-ACK for multicast SPS PDSCHs and HARQ-ACK for unicast SPS PDSCHs.

For example, when a PUCCH resource carrying HARQ-ACK feedback for a unicast SPS PDSCH and a PUCCH resource carrying HARQ-ACK feedback for a group common SPS (e.g., multicast SPS) PDSCH are allocated to the same UL slot, the UE may multiplex HARQ-ACK feedback for the unicast SPS PDSCH and HARQ-ACK feedback for the group common SPS PDSCH in one PUCCH resource.

For multiplexing HARQ-ACK for group common SPS PDSCH(s) and HARQ-ACK for unicast SPS PDSCH(s) (if present, and SR), (referring to the method in Table 6 above), the UE may determine the PUCCH resource based on SPS PUCCH ACK/NACK related list information (e.g., sps-PUCCH-AN-List) in the PUCCH configuration (e.g., PUCCH-config) for unicast.

In this regard, when NACK only-based HARQ-ACK is configured for group common SPS, NACK only-based HARQ-ACK may be transformed to ACK/NACK-based HARQ-ACK. Alternatively, when NACK only-based HARQ-ACK is configured for group common SPS, NACK only based HARQ-ACK may be dropped.

When HARQ-ACKs for multicast SPS and unicast SPS are multiplexed in the determined PUCCH resource, the UE may determine/construct/generate HARQ-ACK information bits according to at least one of the following examples.

As an example, HARQ-ACK information bits may be ordered based on ascending order of SPS configuration index from the lowest SPS configuration index for both group common SPS PDSCH(s) and unicast SPS PDSCH(s). A base station (e.g., gNB) may configure different SPS configuration indexes for group common SPS PDSCH(s) and (HARQ-ACK) unicast SPS PDSCH(s).

As another example, HARQ-ACK information bits for all unicast SPS PDSCH(s) may be ordered before HARQ-ACK information bits for all multicast SPS PDSCH(s). For HARQ-ACK information bits for all unicast SPS PDSCH(s), HARQ-ACK information bits may be ordered based on the ascending order of SPS configuration index from the lowest SPS configuration index for unicast SPS PDSCH(s). For HARQ-ACK information bits for all multicast SPS PDSCH(s), HARQ-ACK information bits may be ordered based on the ascending order of SPS configuration index from the lowest SPS configuration index for multicast SPS PDSCH(s).

For another example, when a PUCCH resource carrying HARQ-ACK feedback for a unicast SPS PDSCH and a PUCCH resource carrying HARQ-ACK feedback for a group common SPS (e.g., multicast SPS) PDSCH are allocated to the same UL slot, the UE may drop HARQ-ACK for group common SPS PDSCH(s) and transmit HARQ-ACK for unicast SPS PDSCH(s) based on PUCCH configuration for unicast (Example 6-1).

For another example, when a PUCCH resource carrying HARQ-ACK feedback for a unicast SPS PDSCH and a PUCCH resource carrying HARQ-ACK feedback for a group common SPS (e.g., multicast SPS) PDSCH are allocated to the same UL slot, the UE may transmit another SPS PDSCH with the same cast type as the SPS PDSCH with the lowest SPS configuration index while dropping another SPS PDSCH. If the UE transmits HARQ-ACK for group common SPS PDSCH(s), the UE may transmit HARQ-ACK for group common SPS PDSCH(s) based on PUCCH configuration for multicast (Example 6-2).

For another example, when a PUCCH resource carrying HARQ-ACK feedback for a unicast SPS PDSCH and a PUCCH resource carrying HARQ-ACK feedback for a group common SPS (e.g., multicast SPS) PDSCH are allocated to the same UL slot, if SR is multiplexed together, the UE may drop HARQ-ACK for group common SPS PDSCH(s) and transmit HARQ-ACK for SR and unicast SPS PDSCH(s) based on PUCCH configuration for unicast. If SR is not multiplexed together, the UE may operate as in Example 6-1 and Example 6-2 described above.

Embodiment 7

This embodiment relates to a PUCCH resource determination method in the case of multiplexing NACK only-based HARQ-ACK for multicast SPS PDSCH and ACK/NACK-based HARQ-ACK for multicast SPS PDSCH.

For example, for multiplexing NACK only-based HARQ-ACK and ACK/NACK-based HARQ-ACK for multicast SPS PDSCHs, (referring to the method in Table 6 above), the UE may determine the PUCCH resource based on the SPS PUCCH ACK/NACK related list information (e.g., sps-PUCCH-AN-List) in the PUCCH configuration for multicast for ACK/NACK-based HARQ-ACK.

In this regard, when PUCCH configuration for multicast is not configured/provided, PUCCH configuration for unicast may be used. As a detailed example, if the SPS PUCCH ACK/NACK related list information (e.g., sps-PUCCH-AN-ListMulticast) in the PUCCH configuration for multicast is not configured, SPS PUCCH ACK/NACK-related list information (e.g., sps-PUCCH-AN-List) in PUCCH configuration for unicast may be used to determine a PUCCH resource.

Additionally/alternatively, when scheduling request (SR) is multiplexed together, (referring to the method in Table 6 above), the UE may determine the PUCCH resource based on the SPS PUCCH ACK/NACK related list information (e.g., sps-PUCCH-AN-List) in the PUCCH configuration for unicast.

Alternatively, when SR is multiplexed together, the UE may drop HARQ-ACK for group common SPS PDSCH(s) and transmit SR based on PUCCH configuration for unicast. Alternatively, if SR is multiplexed together, the UE may transmit HARQ-ACK(s) for group common SPS PDSCH(s) and drop the SR.

Embodiment 8

This embodiment relates to a reception method related to the group common SPS PDSCH and unicast SPS PDSCH described above.

When group common SPS PDSCH(s) and unicast SPS PDSCH(s) are scheduled in the same DL slot, if the UE can not receive all SPS PDSCH(s), the UE may select some SPS PDSCH(s) to receive according to at least one of the following examples.

For example, the UE may select the SPS PDSCH(s) based on the ascending order of the SPS configuration index from the lowest SPS configuration index for both group common SPS PDSCH(s) and unicast SPS PDSCH(s). the terminal may not receive all unselected SPS PDSCH(s). A base station (e.g. gNB) may configure different SPS configuration indexes for group common SPS PDSCH(s) and (HARQ-ACK) unicast SPS PDSCH(s).

For another example, if the UE may receive all unicast SPS PDSCH(s), the UE may select all unicast SPS PDSCH(s), and then, the UE may select the group common SPS PDSCH(s) based on the ascending order of the SPS configuration index from the lowest SPS configuration index for the group common SPS PDSCH(s). The UE may not receive all unselected SPS PDSCH(s). When the UE cannot receive all unicast SPS PDSCH(s), the UE may select the unicast SPS PDSCH(s) based on the ascending order of the SPS configuration index from the lowest SPS configuration index for the unicast SPS PDSCH(s). the UE may not receive all unselected SPS PDSCH(s), including all group common SPS PDSCH(s).

For another example, the UE may select unicast SPS PDSCH(s) with high priority based on the ascending order of the SPS configuration index from the lowest SPS configuration index for the unicast SPS PDSCH(s). Then, the UE may select the group common SPS PDSCH(s) with high priority based on the ascending order of the SPS configuration index from the lowest SPS configuration index for the group common SPS PDSCH(s). Then, the UE may select unicast SPS PDSCH(s) with low priority based on the ascending order of the SPS configuration index from the lowest SPS configuration index for the unicast SPS PDSCH(s). Then, the UE may select the group common SPS PDSCH(s) with low priority based on the ascending order of the SPS configuration index from the lowest SPS configuration index for the group common SPS PDSCH(s). The UE may not receive all unselected SPS PDSCH(s).

Afterwards, the UE may determine the PUCCH resource by considering only the HARQ-ACK(s) for the selected SPS PDSCH(s). Additionally, the UE may determine/configure/generate HARQ-ACK information bit(s) for HARQ-ACK(s) for the selected SPS PDSCH(s).

With regard to the examples described above in the present disclosure, when the UE selects the group common SPS PDSCH(s), regardless of the SPS configuration index for the multicast/broadcast SPS PDSCH(s), the UE may prioritize multicast SPS PDSCH(s) over broadcast SPS PDSCH(s).

Embodiment 9

This embodiment relates to a method of determining a monitoring occasion for constructing a HARQ-ACK codebook in a case that a serving cell in which a CFR configuration presents is in a deactivated state.

For example, if serving cell c is deactivated (as in 3GPP TS 38.213 clause 9.1.2.1), the UE may use the DL BWP provided by a higher layer parameter (e.g. firstActiveDownlinkBWP-Id) as an active DL BWP for determining a set of $M_{A,c}$ occasions for candidate PDSCH receptions.

In this embodiment, the set of $M_{A,c}$ opportunities may correspond to the set of MX, opportunities for Type 1 HARQ-ACK codebook construction (e.g., referring to a set of MX, occasions for candidate PDSCH receptions in clause 9.1.2.1 of 3GPP TS 38.213).

If a serving cell is deactivated and CFR has been configured in the serving cell, the UE may not receive multicast PDSCH on the serving cell.

For the deactivated serving cell where CFR has been configured, the UE may determine the set of $M_{A,c}$ occasions for Type 1 HARQ-ACK codebook according to at least one of the below examples.

For example, the UE may determine the set of $M_{A,c}$ occasions assuming that the UE is not configured to monitor PDCCH for multicast DCI formats for serving cell c, regardless of whether a CFR is associated with the DL BWP provided by a higher layer parameter (e.g., firstActiveDownlinkBWP-Id).

For another example, if a CFR is associated with the DL BWP provided by a higher layer parameter (e.g., firstActiveDownlinkBWP-Id), the UE may determine the set of MX, occasions assuming that the UE is configured to monitor PDCCH for multicast DCI formats for serving cell c. If any CFR is not associated with the DL BWP provided by a higher layer parameter (e.g., firstActiveDownlinkBWP-Id), the UE may determine the set of $M_{A,c}$ occasions assuming that the UE is not configured to monitor PDCCH for multicast DCI formats for serving cell c.

Alternatively, if any CFR is not associated with the DL BWP provided by a higher layer parameter (e.g., firstActiveDownlinkBWP-Id), but if a CFR is associated with a DL BWP of the serving cell, the UE may use the DL BWP for determining the set of $M_{A,c}$ occasions for candidate PDSCH receptions assuming that the UE is configured to monitor PDCCH for multicast DCI format(s) for serving cell c. At this time, if there are more than one DL BWP associated with a CFR for the serving cell, the DL BWP may be indicated by a base station or selected based on the lowest (or highest) BWP index. Alternatively, if there is no DL BWP associated with a CFR for the serving cell, the UE may determine the set of MX, occasions assuming that the UE is not configured to monitor PDCCH for multicast DCI format(s) for serving cell c.

Figure 7:
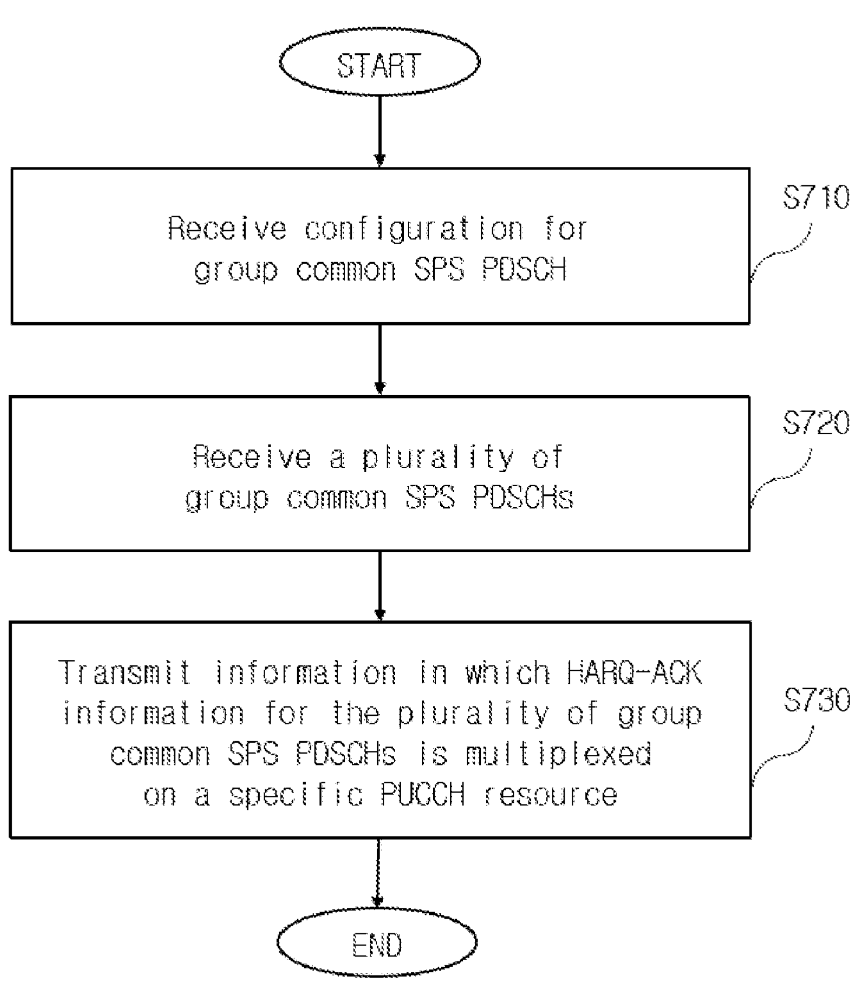
FIG. 7 is a diagram illustrating an operation of a terminal for an uplink transmission/reception method according to an embodiment of the present disclosure.

FIG. 7 is a diagram illustrating the operation of a terminal for an uplink transmission and reception method according to an embodiment of the present disclosure.

FIG. 7 illustrates the operation of a terminal based on the previously proposed method (e.g., any one or a combination of embodiments 1 to 9 and detailed embodiments thereof). The example in FIG. 7 is for convenience of explanation and does not limit the scope of the present disclosure. Some step(s) illustrated in FIG. 7 may be omitted depending on the situation and/or setting. Additionally, the terminal in FIG. 7 is only an example and may be implemented as a device illustrated in FIG. 10 below. For example, the processor 102/202 of FIG. 10 may control to transmit or receive channel/signal/data/information, etc. (e.g., RRC signaling, MAC CE, UL/DL scheduling). DCI, SRS, PDCCH, PDSCH, PUSCH, PUCCH, etc.) using the transceiver 106/206 and may control to store received channels/signals/data/information, etc. in the memory 104/204.

Figure 10:
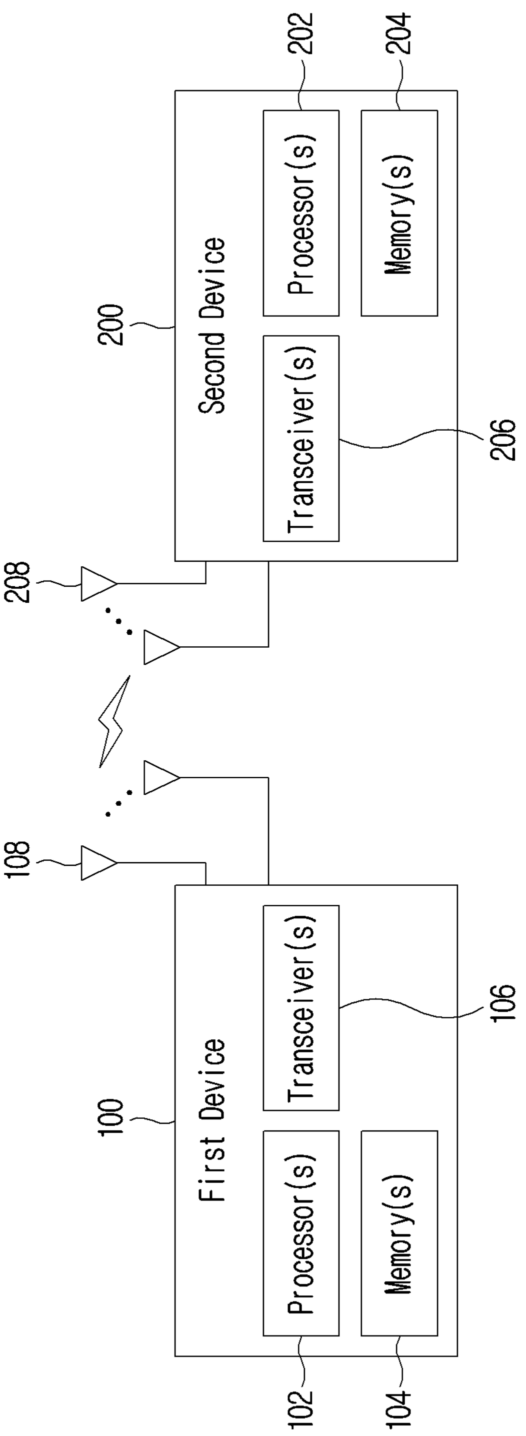
FIG. 10 illustrates a block diagram of a wireless communication system according to an embodiment of the present disclosure.

Additionally, the operations of FIG. 7 may be processed by one or more processors 102, 202 of FIG. 10, and the operation of FIG. 7 may be stored in memory (e.g., one or more memories 104, 204 of FIG. 10) in the form of instructions/programs (e.g., instructions, executable code) for driving at least one processor (e.g., 102, 202) of FIG. 10.

Referring to FIG. 7, in step S710, the terminal may receive information including a plurality of configurations for the group common SPS PDSCH.

For example, as in the description and above-described embodiments of the present disclosure, the terminal may receive one or more SPS configurations related to group common transmission from the base station through an RRC message, etc.

In step S720, the terminal may receive a plurality of group common SPS PDSCHs based on the plurality of configurations. Here, the plurality of group common SPS PDSCHs may correspond to SPS PDSCHs transmitted based on the plurality of group common SPS configurations that are respectively activated.

For example, as in the description and above-described embodiments of the present disclosure, a group-configured scheduling-radio network temporary identifier (G-CS-RNTI) is configured for each of the plurality of configurations, and transmission of the plurality of group common SPS PDSCHs may each be activated based on a DCI format scrambled with the G-CS-RNTI.

In step S730, the terminal may transmit HARQ-ACK information for the plurality of group common SPS PDSCHs. Here, the terminal may transmit HARQ-ACK information for the plurality of SPS PDSCHs (i.e., information determined by multiplexing HARQ-ACK bits) on a specific PUCCH resource.

At this time, when the HARQ-ACK information is configured to a specific HARQ-ACK reporting mode (e.g., NACK only-based HARQ-ACK scheme), the HARQ-ACK information (i.e., HARQ-ACK information for the plurality of SPS PDSCHs) may be multiplexed by transforming to another HARQ-ACK reporting mode (e.g., ACK/NACK-based HARQ-ACK scheme).

Here, the specific HARQ-ACK reporting mode may include that HARQ-ACK information including only the ACK value is not transmitted, and HARQ-ACK information is transmitted only in the case of non-ACK (NACK). Additionally, the another HARQ-ACK reporting mode may include generating an ACK value or NACK value as HARQ-ACK information based on whether the transport block is successfully decoded.

For example, referring to the description in the present disclosure and the above-described embodiments, the specific HARQ-ACK reporting mode corresponds to the NACK only-based HARQ-ACK scheme, and the another HARQ-ACK reporting mode may correspond to the ACK/NACK-based HARQ-ACK scheme.

Additionally, as in the description and above-described embodiments of the present disclosure, with respect to the specific PUCCH resource above, if the PUCCH configuration related to the HARQ-ACK information is not configured, the specific PUCCH resource may be determined based on other PUCCH configuration related to HARQ-ACK information for unicast SPS PDSCH. In this case, the specific PUCCH resource may be determined based on SPS PUCCH AckNack (AN) related list information included in the other PUCCH configuration and the number of bits of the HARQ-ACK information for the plurality of group common SPS PDSCHs.

Additionally, as in the description and above-described embodiments of the present disclosure, with respect to the specific PUCCH resource above, if the PUCCH configuration related to the HARQ-ACK information is configured, the specific PUCCH resource may be determined based on PUCCH configuration related to the HARQ-ACK information. In this case, the specific PUCCH resource may be determined based on SPS PUCCH AckNack (AN) related list information for multicast included in the PUCCH configuration and the number of bits of the HARQ-ACK information for the plurality of group common SPS PDSCHs.

In addition, the specific HARQ-ACK reporting mode may be configured based on multicast-related HARQ feedback option information (e.g., harq-Feedback-Option-Multicast) indicating one of two HARQ-ACK reporting modes (e.g., NACK only-based HARQ-ACK scheme, ACK/NACK-based HARQ-ACK scheme).

In addition, as in the description in the present disclosure and the above-described embodiments, multiplexing of HARQ-ACK information for the plurality of group common SPS PDSCHs may be performed based on PUCCH resources carrying HARQ-ACK information for each of the plurality of the group common SPS PDSCHs being allocated to the same uplink slot.

Figure 8:
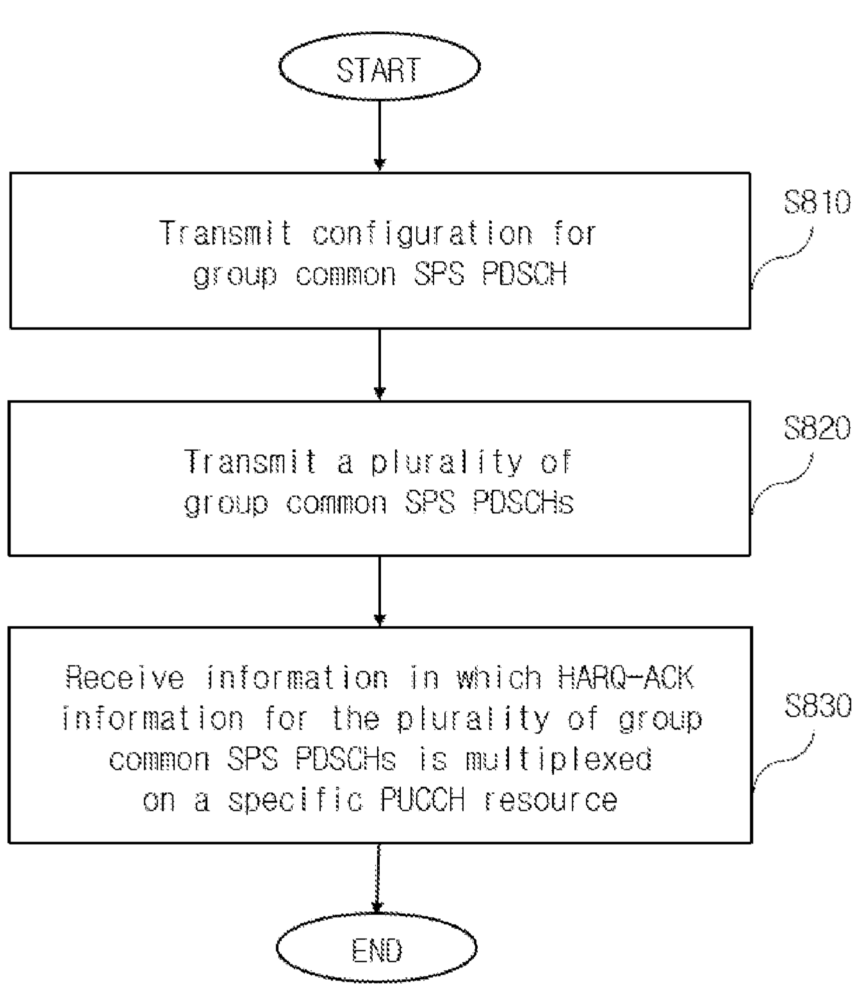
FIG. 8 is a diagram illustrating an operation of a base station for an uplink transmission/reception method according to an embodiment of the present disclosure.

FIG. 8 is a diagram illustrating the operation of a base station for an uplink transmission and reception method according to an embodiment of the present disclosure.

FIG. 8 illustrates the operation of a base station based on the previously proposed method (e.g., any one or a combination of embodiments 1 to 9 and detailed embodiments thereof). The example in FIG. 8 is for convenience of explanation and does not limit the scope of the present disclosure. Some step(s) illustrated in FIG. 8 may be omitted depending on the situation and/or setting. Additionally, the terminal in FIG. 8 is only an example and may be implemented as a device illustrated in FIG. 10 below. For example, the processor 102/202 of FIG. 10 may control to transmit or receive channel/signal/data/information, etc. (e.g., RRC signaling, MAC CE, UL/DL scheduling). DCI, SRS, PDCCH, PDSCH, PUSCH, PUCCH, etc.) using the transceiver 106/206 and may control to store received channels/signals/data/information, etc. in the memory 104/204.

Additionally, the operations of FIG. 8 may be processed by one or more processors 102, 202 of FIG. 10, and the operation of FIG. 8 may be stored in memory (e.g., one or more memories 104, 204 of FIG. 10) in the form of instructions/programs (e.g., instructions, executable code) for driving at least one processor (e.g., 102, 202) of FIG. 10.

Referring to FIG. 8, in step S810, the base station may transmit information including a plurality of configurations for the group common SPS PDSCH.

For example, as in the description and above-described embodiments of the present disclosure, the base station may configure one or more SPS configurations related to group common transmission to the terminal through an RRC message, etc.

In step S820, the base station may transmit a plurality of group common SPS PDSCHs based on the plurality of configurations. Here, the plurality of group common SPS PDSCHs may correspond to SPS PDSCHs transmitted based on the plurality of group common SPS configurations that are respectively activated.

For example, as in the description and above-described embodiments of the present disclosure, a group-configured scheduling-radio network temporary identifier (G-CS-RNTI) is configured for each of the plurality of configurations, and transmission of the plurality of group common SPS PDSCHs may each be activated based on a DCI format scrambled with the G-CS-RNTI.

In step S830, the base station may receive information in which HARQ-ACK information for the plurality of group common SPS PDSCHs is multiplexed. Here, the base station may receive the multiplexed information on a specific PUCCH resource.

At this time, when the HARQ-ACK information is configured to a specific HARQ-ACK reporting mode (e.g., NACK only-based HARQ-ACK scheme), the HARQ-ACK information (i.e., HARQ-ACK information for the plurality of SPS PDSCHs) may be multiplexed by transforming to another HARQ-ACK reporting mode (e.g., ACK/NACK-based HARQ-ACK scheme).

Here, the specific HARQ-ACK reporting mode may include that HARQ-ACK information including only the ACK value is not transmitted, and HARQ-ACK information is transmitted only in the case of non-ACK (NACK). Additionally, the another HARQ-ACK reporting mode may include generating an ACK value or NACK value as HARQ-ACK information based on whether the transport block is successfully decoded.

For example, referring to the description in the present disclosure and the above-described embodiments, the specific HARQ-ACK reporting mode corresponds to the NACK only-based HARQ-ACK scheme, and the another HARQ-ACK reporting mode may correspond to the ACK/NACK-based HARQ-ACK scheme.

Additionally, as in the description and above-described embodiments of the present disclosure, with respect to the specific PUCCH resource above, if the PUCCH configuration related to the HARQ-ACK information is not configured, the specific PUCCH resource may be determined based on other PUCCH configuration related to HARQ-ACK information for unicast SPS PDSCH. In this case, the specific PUCCH resource may be determined based on SPS PUCCH AckNack (AN) related list information included in the other PUCCH configuration and the number of bits of the HARQ-ACK information for the plurality of group common SPS PDSCHs.

Additionally, as in the description and above-described embodiments of the present disclosure, with respect to the specific PUCCH resource above, if the PUCCH configuration related to the HARQ-ACK information is configured, the specific PUCCH resource may be determined based on PUCCH configuration related to the HARQ-ACK information. In this case, the specific PUCCH resource may be determined based on SPS PUCCH AckNack (AN) related list information for multicast included in the PUCCH configuration and the number of bits of the HARQ-ACK information for the plurality of group common SPS PDSCHs.

In addition, the specific HARQ-ACK reporting mode may be configured based on multicast-related HARQ feedback option information (e.g., harq-Feedback-Option-Multicast) indicating one of two HARQ-ACK reporting modes (e.g., NACK only-based HARQ-ACK scheme, ACK/NACK-based HARQ-ACK scheme).

In addition, as in the description in the present disclosure and the above-described embodiments, multiplexing of HARQ-ACK information for the plurality of group common SPS PDSCHs may be performed based on PUCCH resources carrying HARQ-ACK information for each of the plurality of the group common SPS PDSCHs being allocated to the same uplink slot.

Hereinafter, a method in which a base station provides a group common SPS configuration to one or more terminals, and the base station and the terminal perform group common SPS transmission and reception and HARQ-ACK transmission and reception will be described in detail.

Figure 9:
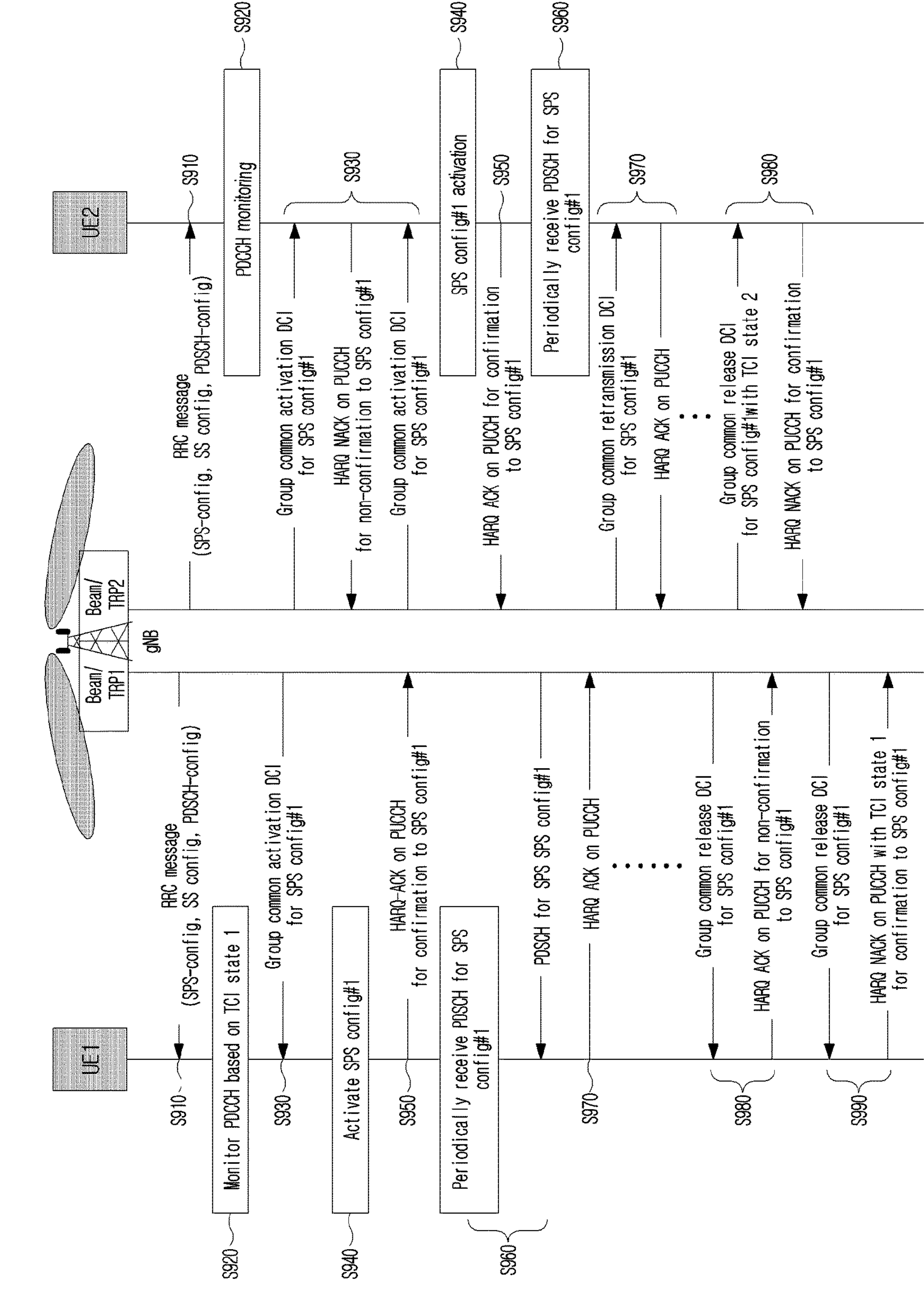
FIG. 9 is a diagram for describing a signaling procedure of a network side and a terminal according to the present disclosure.

FIG. 9 is a diagram for illustrating a signaling procedure of the network side and the terminal according to an embodiment of the present disclosure.

FIG. 9 shows an example of signaling between a network side and a terminal (UE) in an M-TRP environment (or S-TRP environment) to which embodiments (e.g., embodiments 1 to 9, or a combination of one or more of the detailed embodiments thereof) of the present disclosure described above may be applied.

Here, the UE/network side is exemplary, and may be replaced with various devices to be described with reference to FIG. 10. FIG. 9 is for convenience of description, and does not limit the scope of the present disclosure. Also, some step(s) shown in FIG. 9 may be omitted depending on circumstances and/or settings. In addition, in the operation of the network side/UE of FIG. 9, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may enter the RRC_CONNECTED mode, and may report a message indicating one or more interested MBS services to the network side. Here, the message may be reported to the network side through at least one of Uplink Control Information (UCI), Control Element (MAC CE), and RRC messages.

The MBS service of interest on the message may indicate either TMGI or G-RNTI (Group Radio Network Temporary Identifier) listed in a DL message received from the network side. G-RNTI indicates the terminal group identifier for receiving the MBS.

For example, the DL message may be a service availability message listing TMGI #1, TMGI #3, TMGI #5, and TMGI #10. When the UE is interested in TMGI #5, the UE may indicate the order of TMGI #5 in the message. That is, the terminal may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

The network side receiving the message may provide a common frequency resource (CFR) configuration, one or more group common SPS configuration including a TCI state, a search space configuration including a TCI state, and a GC (group common)-CS-RNTI value to the UE (e.g., UE 1 and UE 2) through the RRC message (S910). Upon receiving the RRC message, the UE may configure one or more group common SPS configurations according to the RRC message.

Here, the RRC message may be a group common message transmitted through a PTM MCCH (Multicast Control Channel) or a UE-dedicated message transmitted through a UE-specific DCCH (Dedicated Control Channel).

In addition, The UE may be configured with at least a G-RNTI value for each MBS CFR or each serving cell. GC-CS-RNTI may be configured/used for activation, retransmission or release of one or more group common SPS configurations.

For example, when the UE is not configured with GC-CS-RNTI for CFR or serving cell, and CS-RNTI is configured for CFR or serving cell, the UE may use CS-RNTI for activating, retransmitting, or releasing of one or more group common SPS configurations.

The network side may associate one GC-CS-RNTI value with a TMGI list or a G-RNTI list. In this case, the network side may provide a TMGI list or a G-RNTI list associated with the GC-CS-RNTI value.

Each group common SPS configuration (i.e., SPS-config) may be set as the following information element as shown in Table 8.

TABLE 8

```
SPS-Config ::= SEQUENCE {
  periodicity ENUMERATED {ms10, ms20, ms32, ms40, ms64, ms80, ms128, ms160,
ms320, ms640,
  spare6, spare5, spare4, spare3, spare2, spare1},
  nrofHARQ-Processes INTEGER (1..8),
  n1PUCCH-AN PUCCH-ResourceId OPTIONAL, -- Need M
  mcs-Table ENUMERATED {qam64LowSE} OPTIONAL, -- Need S
  sps-ConfigIndex-r16 SPS-ConfigIndex-r16 OPTIONAL, -- Cond SPS-List
  harq-ProcID-Offset-r16 INTEGER (0..15) OPTIONAL, -- Need R
  periodicityExt-r16 INTEGER (1..5120) OPTIONAL, -- Need R
  harq-CodebookID-r16 INTEGER (1..2) OPTIONAL, -- Need R
  pdsch-AggregationFactor-r16 ENUMERATED {n1, n2, n4, n8 } OPTIONAL --
Need S
  tci-StatesToAddModList SEQUENCE (SIZE(1..maxNrofTCI-States)) OF TCI-State
OPTIONAL, -- Need N tci-StatesToReleaseList SEQUENCE (SIZE(1..maxNrofTCI-
States)) OF TCI-StateId OPTIONAL, -- Need N
  GC-CS-RNTI RNTI-Value OPTIONAL, -- Need R}
```

In table 8, 'harq-CodebookID' may indicate the corresponding HARQ-ACK codebook for the SPS PDSCH and the HARQ-ACK codebook index for the ACK for the SPS PDSCH release.

'harq-ProcID-offset' may indicate an offset used to derive the HARQ process ID.

'mcs-table' may indicate an MCS table to be used by the UE for DL SPS. If the 'mcs-table' field is present, the UE must use the MCS table of the low-SE 64QAM table. If the corresponding field does not exist, the field 'mcs-table' of the 'PDSCH-Config' is configured to 'qam256', and the format of the active DCI is 1_1, the UE may apply the 256QAM table. Otherwise, the UE may apply a non-low-SE 64QAM table.

'n1PUCCH-AN' may mean a HARQ resource for PUCCH for DL SPS. The network side may configure the resource in format 0 or format 1. The actual PUCCH-resource is set in 'PUCCH-Config' and may be referred to as an ID.

'nrofHARQ-process' may indicate the number of HARQ processes configured for SPS DL.

'pdsch-AggregationFactor' may indicate the number of repetitions of the SPS PDSCH. If there is no corresponding field, the UE may apply a PDSCH aggregation factor of 'PDSCH-Config'.

'periodicity' may indicate the period of the DL SPS.

'periodicityExt' may be used to calculate the periodicity of the DL SPS. If the corresponding field exists, the 'periodicity' field may be ignored.

The following cycle may be supported according to the configured SCS[ms].

15 kHz: 'periodicityExt', where 'periodityExt' may have a value between 1 and 640.

30 kHz: 0.5×'periodicityExt', where 'periodicityExt' may have a value between 1 and 1280.

60 kHz in normal CP: 0.25×'periodityExt', where 'periodityExt' may have a value between 1 and 2560.

60 kHz (including ECP): 0.25×'periodityExt', where 'periodityExt' may have a value between 1 and 2560.

120 kHz: 0.125×'periodityExt', where 'periodityExt' may have a value between 1 and 5120.

'sps-ConfigIndex' may indicate one index among multiple SPS configurations.

'tci-StatesToAddModList' may indicate a TCI state list indicating a transmission configuration including a QCL relationship between a DL RS and a PDSCH DMRS port in one RS set.

'GC-CS-RNTI' may indicate a GC-CS-RNTI value associated with 'sps-ConfigIndex'. If the corresponding field does not exist and another GC-CS-RNTI value is configured for the CFR or serving cell related to 'sps-ConfigIndex', the UE may use a different GC-CS-RNTI value for 'sps-ConfigIndex'. If the corresponding field does not exist and no other GC-CS-RNTI value is configured for the serving cell or CFR related to 'sps-ConfigIndex', the UE may use the CS-RNTI value for 'sps-ConfigIndex'.

For example, one or more SPS configurations may be configured and associated with a TCI state list (e.g., 'tci-StatesToAddModList' in 'SPS-config' for CFR). For one or more CFRs, different SPS configurations may be configured and associated with other 'tci-StatesToAddModList' in 'SPS-config'. If the group common SPS configuration is not configured to 'tci-StatesToAddModList' in 'SPS-config', the SPS configuration may be associated with 'tci-StatesToAddModList' in 'PDSCH-config' of the CFR or the serving cell of the UE.

Here, when 'tci-StatesToAddModList' is not configured as the SPS configuration index in 'SPS-config', the SPS configuration index may be a UE-specific SPS configuration rather than a group common SPS configuration used for MBS. That is, if 'tci-StatesToAddModList' is not configuration as the SPS configuration index in 'SPS-config', the UE may consider that the SPS configuration is a UE-specific SPS configuration rather than a group common SPS configuration.

If 'tci-StatesToAddModList' is configuration as an SPS configuration index in 'SPS-config', the UE may consider that the SPS configuration is a group common SPS configuration.

As another example, one or more TMGIs may be configured and associated with 'tci-StatesToAddModList'. If the SPS PDSCH transmission of the SPS configuration is mapped to the TMGI associated with 'tci-StatesToAddModList', the SPS PDSCH transmission of the SPS configuration may be associated with the 'tci-StatesToAddModList'.

As another example, one or more G-RNTIs may be configured and associated with 'tci-StatesToAddModList'. When SPS PDSCH transmission of SPS configuration is mapped to MBS service of G-RNTI associated with 'tci-StatesToAddModList', SPS PDSCH transmission of SPS configuration may be associated with 'tci-StatesToAddModList'.

As another example, a value of GC-CS-RNTI or CS-RNTI may be configured and associated with 'tci-StatesToAddModList'. When the SPS configuration is mapped to a value of GC-CS-RNTI or CS-RNTI associated with 'tci-StatesToAddModList', the SPS configuration may be associated with 'tci-StatesToAddModList'.

As another example, one SPS configuration may configured one or more HARQ process IDs up to 'nrofHARQ-Processes' (up to 'nrofHARQ-Processes'). The HARQ process ID may be associated with a slot from which DL SPS PDSCH transmission starts and is derived from one of Equations 3 and 4 below.

$$HARQ\ \text{process}\ ID = [\text{floor}\ (\text{CURRENT\_slot} \times 10/(numberOfSlotsPerFrame \times \text{periodicity}))]\ \text{modulo}\ nrofHARQ\text{-Processes} \quad \text{[Equation 3]}$$

$$HARQ\ \text{process}\ ID = [\text{floor}\ (\text{CURRENT\_slot} \times 10/(numberOfSlotsPerFrame \times \text{periodicity}))]\ \text{modulo}\ nrofHARQ\text{-Processes} + harq\text{-}ProcID\text{-Offset} \quad \text{[Equation 4]}$$

As another example, the UE may be configured separately with one or more UE-specific SPS configuations.

As option 2-1, both the UE-specific SPS configuration and the group common SPS configuration may share the 'sps-ConfigIndex' value. For example, 'sps-ConfigIndex' may be configured from 0 to 4 for five UE-specific SPS configurations, but 'sps-ConfigIndex' may be configured from 7 to 8 for two group common SPS configurations. In this case, 'sps-ConfigIndex' values 5 and 6 may not be used for the UE.

In the above option, upon receiving the DCI for the SPS configuration, the UE may determine whether the SPS configuration is group common or UE specific by checking the 'sps-ConfigIndex' value included in the DCI. In DCI, the value of 'sps-ConfigIndex' may be indicated by a HARQ process number field or a configuration index field of DCI.

As option 2-2, the UE-specific SPS configuration and the group common SPS configuration may have a separate space for the 'sps-ConfigIndex' value. For example, 'sps-ConfigIndex' may be configured from 0 to 4 for five UE-specific SPS configurations, but 'sps-ConfigIndex' may be configured from 0 to 1 for two group common SPS configurations.

In the above option, upon receiving the DCI for the SPS configuration, the UE may check one of the following 1) to 4) without checking the 'sps-ConfigIndex' value to determine whether the SPS configuration is group common or UE specific.

1) RNTI value used for CRC scrambling of DCI

For example, when the RNTI value corresponds to a specific value such as the GC-CS-RNTI value, the SPS configuration may be group common.

DCI format of DCI

For example, when the MBS-specific DCI format is used for DCI, the SPS configuration may be group common.

3) One or more DCI fields may indicate all '0' or all '1'.

For example, when one or more of 'MCS', 'ZP CSI-RS trigger', and 'SRS request' of DCI all indicate '0', validation of DCI format for activation of group common SPS configuration may be achieved.

HARQ Process Number

For example, one SPS configuration may configure multiple HARQ process numbers up to 'nrofHARQ-Processes'. The first set of HARQ process numbers (e.g., 0, 2, 4) may be used for UE-specific SPS transmission, and the second set of HARQ process numbers (e.g., 1, 3, 5) may be used for group common SPS transmission. The UE may consider that the DL SPS resource of the slot associated with the first set is used for UE-specific SPS transmission, while the DL SPS resource of the slot associated with the second set is used for group common SPS transmission.

Alternatively, one SPS configuration may configure several HARQ process numbers up to 'nrofHARQ-Processes'. The first set of HARQ process numbers (e.g. 0, 2, 4) may be used in the first set of TMGI(s) or G-RNTI(s), but the second set of HARQ process numbers (e.g., 1, 3, 5) may be used in the second set of TMGI(s) or G-RNTI(s). The UE may consider that the DL SPS resource in the slot associated with the HARQ process number of the first set is used for SPS transmission for the TMGI or G-RNTI of the first set, but the DL SPS resource in the slot associated with the HARQ process number of the second set may be used for SPS transmission for the TMGI or G-RNTI of the second set.

If the SPS configuration is configured for the configured CFR, the UE may monitor the PDCCH in the search space (SS) configured in the configured CFR to receive the DCI in which the CRC is scrambled with the GC-CS-RNTI for activation, retransmission, or release of the SPS configuration (S920).

In step S930, for activation, retransmission, or deactivation (release) of one of the SPS configurations, the network side may transmit DCI to the UE through the PDCCH. In this case, the UE may transmit a HARQ NACK on the PUCCH to the network side for non-confirmation of the SPS configuration, and the network side may transmit a DCI back to the UE.

Then, the UE may activate the SPS configuration (e.g., SPS configuration #1) (S940). Then, the UE may transmit a HARQ-ACK for confirmation of the SPS configuration (e.g., SPS configuration #1) to the network side on the PUCCH (S950).

Specifically, the CRC of DCI may be scrambled by GC-CS-RNTI or CS-RNTI. The PDCCH may include at least one of a group common PDCCH or a UE specific PDCCH.

HARQ feedback activation/deactivation for group common SPS configuration may be indicated by (re)activation, retransmission or release DCI of SPS configuration, group common MAC CE, or UE-specific MAC CE.

When HARQ-ACK feedback is enabled or disabled by DCI for activating or releasing SPS configuration, DCI may allocate retransmission resources for SPS configuration, group common MAC CE, or UE-specific MAC CE.

When the enabling/disabling indicator is present in DCI, upon receiving activation/release DCI enabling HARQ-ACK feedback, the UE may transmit a (non)-confirmation to the activation/deactivation DCI. That is, the network side may expect confirmation/non-confirmation transmitted by the UE.

If an enabling/disabling indicator is present in DCI, upon receiving the activation/release DCI disabling HARQ-ACK feedback, the UE may not transmit a non-acknowledgment to the activation/release DCI. That is, the network side may expect that no confirmation/non-confirmation is transmitted by the UE.

When ACK/NACK-based HARQ-ACK feedback is configured, when receiving DCI for activating or releasing SPS configuration, UE-specific confirmation for activation/release of SPS configuration may be transmitted by ACK/NACK of UCI.

Activation/deactivation of SPS configuration DCI and PUCCH resources indicated by 'SPS-config' may be used to transmit confirmation of activation/deactivation of SPS configuration.

The same or different PUCCH resources may be used for different SPS configurations for activation/release confirmation.

i. When the same PUCCH resource is used to check the activation/deactivation of other SPS configurations, a HARQ-ACK (sub) codebook may be configured based on the SPS configuration. Other bits of the HARQ-ACK (sub) codebook may indicate confirmation or non-acknowledgment of other SPS configurations.

When different SPS configurations belong to the same SPS group, 1 bit of the HARQ-ACK (sub) codebook may indicate confirmation or non-confirmation of different SPS configurations within the same SPS group.

ii. When different PUCCH resources are used to check activation/release of different SPS configurations, separate PUCCH resources may be used to check activation/release of each SPS configuration.

When different SPS configurations belong to the same SPS group, one PUCCH resource may indicate confirmation or non-confirmation of different SPS configurations within the same SPS group.

When PUCCH-based acknowledgment for activation/deactivation is multiplexed with multicast or unicast-specific HARQ-ACK feedback, activation/release confirmation for one or more SPS configurations may be multiplexed with general multicast-specific HARQ-ACK in the first bit(s) or last bit(s) of the multicast-specific HARQ-ACK (lower) codebook.

In response to the group common SPS (de)activation DCI, HARQ ACK for UCI may be interpreted as confirmation for activation, and HARQ NACK for UCI may be interpreted as confirmation for deactivation.

In case of group common SPS, when NACK-only HARQ-ACK feedback is configured, when receiving a DCI for activating or releasing the SPS configuration, a group common or UE-specific acknowledgment for the activation/release of the SPS configuration may be transmitted by the ACK/NACK of the UCI.

Activation/deactivation of SPS configuration DCI and PUCCH resources indicated by 'SPS-config' may be used to transmit confirmation of activation/deactivation of SPS configuration.

As option 4-1, if activation/deactivation DCI is confirmed, the UE may transmit NACK for a PUCCH resource dedicated to NACK. If activation/release DCI is not confirmed, the UE may not transmit NACK for a PUCCH resource dedicated to NACK.

As option 4-2, if activation/deactivation DCI is confirmed, the UE may transmit the first sequence through PUCCH. If activation/release DCI is not confirmed, the UE may not transmit PUCCH. Alternatively, the UE may transmit the second sequence on the PUCCH.

The first sequence may be associated with SPS configuration or activation/deactivation of SPS configuration. Different first sequences may be associated with different SPS configurations.

The second sequence may be associated with SPS configuration. Different second sequences may be associated with different SPS configurations.

As option 4-3, the UE may change from NACK-based HARQ-ACK feedback to ACK/NACK-based HARQ-ACK feedback (when activation/release DCI is confirmed). In addition, the UE may transmit an acknowledgment when the ACK/NACK-based HARQ-ACK feedback is configured.

The network side may repeatedly transmit DCI indicating the same 'sps-ConfigIndex' using the same GC-CS-RNTI for activation, retransmission, or deactivation of the SPS configuration. DCI may be repeatedly transmitted in multiple CORESETs with the same or different TCI state. The network side may transmit the same DCI N times in the M-TCI state for activation, retransmission, or deactivation. N and M may be configured by the network side.

For example, the first/second repetition of DCI is transmitted in CORESET with TCI state 1, the third/fourth repetition of DCI is transmitted on CORESET with TCI state 2, and (N−1) of DCI The th/Nth repetition may be transmitted through CORESET with TCI state M. The UE may select one or two TCI states and selectively receive corresponding repetitions of DCI in the CORESET associated with the selected TCI state(s).

When DCI repetitions are transmitted in the same TCI state, the UE may transmit PUCCH based on the last repeated DCI to confirm SPS activation/deactivation. When DCI repetitions are transmitted in different TCI states, the UE may selectively receive DCI repetition(s) and transmit PUCCH based on the last repeated DCI of the selected TCI state for confirmation of SPS activation/deactivation.

The DCI may include the fields for activation, retransmission or deactivation (i.e., release) of the SPS configuration:

Identifier for DCI Formats

The identifier field for the DCI format may indicate either an MBS-specific DCI format or an existing DCI format for MBS.

Carrier Indicator

The carrier indicator field may indicate a (serving or MBS specific) cell of the CFR or a serving cell of the active BWP of the UE associated with the CFR. Here, the group common PDCCH/PDSCH may be transmitted or the configured DL allocation of the SPS PDSCH may be allocated to the SPS configuration indicated by the DCI.

BWP Indicator

The carrier indicator field may indicate the BWP ID assigned to the CFR or the BWP ID of the active BWP of the terminal associated with the CFR. Here, a group common PDCCH/PDSCH may be transmitted or a configured DL allocation of the SPS PDSCH may be allocated to the SPS configuration indicated by the DCI.

frequency domain resource assignment
time domain resource assignment
VRB-PRB mapping
PRB bundling size indicator
rate matching indicator
ZP CSI-RS trigger
modulation and coding scheme
new data indicator (NDI)

The NDI may be configured to 1 for retransmission for the SPS configuration indicated by the DCI. In addition, the NDI may be configured to 0 for activation or release (i.e., deactivation) for the SPS configuration indicated by the DCI.

redundancy version
HARQ process number
downlink assignment index
TPC command for scheduled PUCCH
PUCCH resource indicator
PDSCH-to-HARQ_feedback timing indicator
antenna port(s)
transmission configuration indicator
SRS request
DMRS sequence initialization
priority indicator The DCI (i.e., activation DCI) may indicate activation of a particular SPS configuration by using of the following options:

As option 4-1, for activation of the SPS configuration, the value of the HARQ process number field of the DCI format is the same value as provided by 'sps-ConfigIndex' of the SPS configuration, and may indicate activation of the SPS PDSCH configuration. When all RV fields for the DCI format are configured to '0', validation of the DCI format may be performed. If validity is confirmed after receiving the DCI, the UE may consider the information in the DCI format as valid activation of the DL SPS configuration. If validation is not performed, the UE may discard all information in the DCI format.

In option 4-1 above, the SPS configuration may support both a group common SPS by only GC-CS-RNTI, a UE-specific SPS by only CS-RNTI, or a group common SPS and UE-specific SPS with different HARQ process IDs or additional indications for 'group common' or 'UE-specific'.

In option 4-2, for activation of the SPS configuration, a DCI format configuration index field is added, and the configuration index field has the same value as provided by 'sps-ConfigIndex' of the SPS configuration and may indicate activation of the SPS PDSCH configuration. When the NDI fields for the DCI format are all configured to '0' (or all '1') and the RV fields for the DCI format are all configured to '0', validation of the DCI format may be achieved.

In the above option 4-2, the SPS configuration may support the group common SPS only when there is a configuration index field or support the UE-specific SPS only when there is no configuration index field.

When validation is achieved, the UE may consider the information in the DCI format as valid activation or valid release of DL SPS or configured UL grant type 2. If validation is not achieved, the UE may discard all information in DCI format.

For group common SPS, the network side, by group common or UE specific RRC message or by group common or UE specific MAC CE, may provide the UE with one or more of a service-resource mapping for an MBS service identified by TMGI or G-RNTI or GC-CS-RNTI. The data of the MBS service may be carried through the multicast traffic logical channel, that is, the MBS radio bearer (MRB) of the MTCH associated with the MBS service. The RRC message may be a group common message transmitted through a PTM multicast control channel (MCCH) or a UE-only message transmitted through a UE-specific dedicated control channel (DCCH).

If the group common DCI for the activation of the SPS configuration is not confirmed by the UE, that is, the network side cannot detect the PUCCH TX for confirmation for the active DCI or receives a non-confirmation from the UE, the network side may perform an operation according to options (options 5-1 to 5-3) to be described later.

As option 5-1, the network side may retransmit the group common DCI indicating activation of the SPS configuration until the active DCI is confirmed by the UE.

As option 5-1A, another UE that has already activated the SPS configuration may ignore the retransmitted activated DCI. That is, confirmation of the retransmitted active DCI may not be transmitted from another UE to the network side.

As option 5-1B, another UE that has already activated the SPS confirmation may re-transmit the confirmation of the retransmitted active DCI to the network side while receiving the SPS PDCCH/PDSCH transmission for the activated SPS configuration without re-activating the SPS configuration.

As option 5-1C, the other UE that has already activated the SPS confirmation may re-activate the SPS configuration (i.e., release and activate the SPS configuration) and re-transmit the confirmation to the retransmitted active DCI to the network side.

As option 5-2, the network side may provide the UE with a UE-specific DCI for activating the SPS configuration. DCI in which CRC is scrambled by UE-specific CS-RNTI or C-RNTI may indicate 'sps-ConfigIndex' of group common SPS configuration.

As option 5-3, the network side may (re)transmit the TB to the C-RNTI (i.e., PTP transmission) through the UE-specific PDSCH scheduled by DCI.

Here, the network side may retransmit a group common activated DCI (option 1) or a UE specific activated DCI (option 2). In this case, the network side may (re)transmit the TB(s) by PTP transmission until the retransmitted active DCI is confirmed by the UE.

When receiving the activation DCI indicating activation of the SPS configuration in the configured search space, the UE may activate the SPS configuration specified by 'sps-ConfigIndex'.

In addition, upon receiving the DCI, the UE may determine the MBS service(s) associated with one or more of a short ID, an MTCH ID, an MRB ID, a G-RNTI value, and a TMGI value for each SPS PDSCH occasion of the configured DL assignment, based on mapping between MBS services and the SPS configuration indicated in the DCI, mapping between MBS services and HPNs (HARQ Process Numbers) for the SPS configuration indicated in the DCI, and/or mapping between MBS services and, if available, short ID(s) indicated in the DCI.

Then, if UE is interested in the determined MBS service(s), UE may activate the SPS configuration based on the DCI indicating activation of the SPS configuration. If UE is not interested in the determined MBS service(s), UE may not activate the SPS configuration based on the DCI.

If the SPS configuration indicated by the activation DCI belongs to one SPS group which include other SPS configuration(s), upon the DCI indicating activation of the SPS configuration, UE may activate the other SPS configuration(s) belong to the same SPS group.

Alternatively, if the SPS configuration indicated by the activation DCI belongs to one SPS group which include other SPS configuration(s), upon the DCI indicating activation of the SPS configuration, UE may release the other SPS configuration that has been activated.

After activation of the SPS configuration, as shown in Equation 5 below, the UE may sequentially consider that the N-th DL allocation of the SPS PDSCH for the SPS configuration occurs in the slot.

$$(numberOfSlotsPerFrame \times SFN + \text{slot number in the frame}) = [(numberOfSlotsPerFrame \times SFNstart\ \text{time} + slotstart\ \text{time}) + N \times \text{periodicity} \times numberOfSlotsPerFrame/10]\ \text{modulo}\ (1024 \times numberOfSlotsPerFrame) \quad \text{[Equation 5]}$$

Here, the 'SFNstart' time and the 'slotstart' time may be the SFN and slot of the first transmission of the PDSCH in which the DL assignment configured for the SPS configuration was (re)initialized, respectively. The configured DL allocation may be configured as a set of periodic SPS PDSCH occasions for SPS configuration.

In the case of an SFN that is not aligned across the carriers of the cell group, the SFN of the serving cell of the active BWP of the UE related to the CFR may be used to calculate the occurrence of the configured DL assignment.

The DCI may also indicate one or more of a short ID, a MTCH ID, a MRB ID, a G-RNTI value and a TMGI value for activation of the SPS configuration.

If a data unit is available on a MTCH of a MRB for a MBS service, the base station may construct and transmit a TB including the data unit for a SPS PDSCH occasion associated to the MTCH of the MRB for the MBS service, or associated to TMGI of the MBS service, or associated to a short ID of the MBS service, or associated to G-RNTI mapped to the MBS service, according to the service-to-resource mapping.

If the SPS configuration has been activated by UE based on the interested MBS service, UE may periodically receive SPS PDSCH transmission occasions on the configured downlink assignment for the SPS configuration according to the above equation (S960). UE may consider the NDI to have been toggled for reception of each of the SPS PDSCH occasions.

For reception of a specific SPS PDSCH transmission occasion on the configured downlink assignment for the SPS configuration, UE may consider that the SPS PDCH transmission occasion is associated to MTCH, MRB, TMGI, G-RNTI and/or short ID of the MBS service based on mapping between MBS services and the SPS configuration, mapping between MBS services and HPNs (HARQ Process Numbers) for the SPS configuration, and/or mapping between MBS services and, if available, short ID(s), as indicated in the activation DCI or the retransmission DCI and/or configured by the RRC message.

In this regard, when group common SPS PDSCH(s) and unicast SPS PDSCH(s) are scheduled in the same DL slot, if the terminal is not capable of receiving all SPS PDSCHs, the terminal may select some SPS PDSCH(s) to receive based on the method(s) in Embodiment 8 described above.

Hereafter, as in the method in Embodiment 8 described above, the terminal may determine the PUCCH resource by considering only the HARQ-ACK(s) for the selected SPS PDSCH(s), and the terminal may construct/determine HARQ-ACK information bit(s) for HARQ-ACK(s) for the selected SPS PDSCH(s). In selecting some SPS PDSCH(s), when the terminal selects the group common SPS PDSCH(s), the terminal may prioritize multicast SPS PDSCH(s) over broadcast SPS PDSCH(s), regardless of the SPS configuration index for multicast/broadcast SPS PDSCH(s).

If decoding the TB on the SPS PDSCH transmission occasion is unsuccessful, the UE may transmit HARQ NACK to the base station on a PUCCH resource in the configured UL CFR according to PUCCH configuration of the SPS configuration received by the RRC message, and PUCCH resource indicator and PDSCH-to-HARQ_feedback timing indicator received by the DCI activating the SPS configuration.

By using the same PUCCH resource, the terminal may transmit HARQ-ACK for other PDSCH transmission, such as unicast transmission (S970).

In this case, the PUCCH resource for multiplexing unicast transmission (i.e., UE-specific data transmission) and/or multicast transmission (i.e., group common data transmission) may be determined as in the examples below based on the method(s) described above in the embodiments of the present disclosure.

For example, for multiplexing NACK only-based HARQ-ACKs for a plurality of group common SPS PDSCHs, if the PUCCH configuration for multicast is configured/provided in NACK only-based HARQ-ACK mode, the terminal may determine the PUCCH resource based on the sps-PUCCH-AN-List of the PUCCH configuration for multicast (e.g., see Table 7 above) (at this time, considering the method in Table 6 above). If PUCCH configuration for multicast is not configured/provided, PUCCH configuration for unicast may be used, and NACK only-based HARQ-ACKs may be transformed to ACK/NACK-based HARQ-ACKs.

As another example, for multiplexing NACK only-based HARQ-ACK(s) and SR for multiple group common SPS PDSCHs, regardless of whether the PUCCH configuration for multicast is configured/provided for NACK only-based HARQ-ACK mode, the terminal may determine the PUCCH resource based on the sps-PUCCH-AN-List of the PUCCH configuration for unicast (e.g., see Table 7 above) (at this time, considering the method in Table 6 above). In general, if the PUCCH configuration for multicast is configured/provided for ACK/NACK-based HARQ-ACK mode, the terminal may determine the PUCCH resource based on the sps-PUCCH-AN-List of the PUCCH configuration for multicast (e.g., see Table 7 above) (at this time, considering the method in Table 6 above).

As another example, for multiplexing NACK only based HARQ-ACK(s) and unicast SPS PDSCH (and SR) for group common SPS PDSCH, regardless of whether the PUCCH configuration for multicast is configured/provided for NACK only-based HARQ-ACK mode, the terminal may determine the PUCCH resource based on the sps-PUCCH-AN-List of the PUCCH configuration for unicast (e.g., see Table 7 above) (at this time, considering the method in Table 6 above). In general, if the PUCCH configuration for multicast is configured/provided for ACK/NACK-based HARQ-ACK mode, the terminal may determine the PUCCH resource based on the sps-PUCCH-AN-List of the PUCCH configuration for multicast (e.g., see Table 7 above) (at this time, considering the method in Table 6 above).

As another example, for multiplexing NACK only-based HARQ-ACK(s) for group common SPS PDSCH and ACK/NACK-based HARQ-ACK(s) for group common SPS PDSCH, the terminal may determine the PUCCH resource based on the sps-PUCCH-AN-List of the PUCCH configuration for multicast (e.g., see Table 7 above) (at this time, considering the method in Table 6 above). If PUCCH configuration for multicast is not configured/provided, the terminal may determine the PUCCH resource based on the sps-PUCCH-AN-List of the PUCCH configuration for unicast (e.g., see Table 7 above) (at this time, considering the method in Table 6 above).

As another example, for multiplexing NACK only-based HARQ-ACK(s) for group common SPS PDSCH and ACK/NACK-based HARQ-ACK(s) and SR for group common SPS PDSCH, the terminal may determine the PUCCH resource based on the sps-PUCCH-AN-List of the PUCCH configuration for unicast (e.g., see Table 7 above) (at this time, considering the method in Table 6 above).

In addition, in this regard, if the serving cell with the CFR configuration is in a deactivated state, the terminal may determine a set of $M_{A,c}$ occasions for configuring a Type 1 HARQ-ACK codebook (e.g., a set of $M_{A,c}$ occasions for candidate PDSCH receptions in clause 9.1.2.1 of 3GPP TS 38.213), based on the method(s) in Embodiments 9 described above.

Upon receiving the HARQ-ACK(s) based on the TCI state, the network side may transmit the PDCCH and the PDSCH together based on TCI state in the DL CFR configured for retransmission of the TB. The UE may monitor the group common and/or UE-specific PDCCH with the TCI state for the search space configured in the DL CFR in order to receive the retransmission of the TB.

The PDCCH for allocating retransmission resources for SPS configuration may be a group common PDCCH or a UE-specific PDCCH regardless of whether the SPS configuration is activated by a group common PDCCH or a UE-specific PDCCH.

For example, after activating the SPS configuration for a group of UEs, the network side may retransmit the TB of the SPS configuration by only one of the UEs of the group by the UE-specific PDCCH, but other UEs may not receive the retransmission of the TB for the SPS (because the TB was successfully received).

For retransmission of the activated SPS configuration, the network side may transmit DCI to the UE through the PDCCH. The CRC of DCI may be scrambled to one of GC-CS-RNTI, CS-RNTI, G-RNTI and C-RNTI.

In order to decode the TB when transmitting the SPS PDSCH, the UE may consider that the TB is associated with the short ID of the MTCH, MRB, TMGI, G-RNTI and/or MBS service, based on the mapping between the MBS service and the SPS configuration, the mapping between the MBS service and the HPN (HARQ process number) for the SPS configuration, and/or the mapping between the MBS services, and the short ID(s) indicated in the DCI if available.

Upon receiving the PDCCH for retransmission of the TB, the UE may receive the PDSCH scheduled by the DCI of the PDCCH.

Upon successful decoding of the TB on the PDSCH, the UE, as indicated in the activation DCI or retransmission DCI and/or as set by the RRC message, based on the mapping between MBS services and SPS configurations, between MBS services and HARQ process numbers (HPNs) for SPS configurations, and/or between MBS services; If possible, the decoded TB may be considered to be associated with the MTCH, MRB, TMGI, G-RNTI and/or short ID of the MBS service.

If TB decoding in the SPS PDSCH transmission opportunity is successful, the UE may transmit HARQ ACK(s) to the network side, through the PUCCH configuration of the SPS configuration received by the RRC message, and the PUCCH resource indicator received by the retransmission DCI, and the PUCCH resource of the UL CFR configured according to the 'PDSCH-to-HARQ_feedback' timing indicator.

Here, the PUCCH resource for the corresponding HARQ ACK(s) may be determined based on the PUCCH resource determination methods according to the embodiments described above in the present disclosure.

When the network side changes the mapping between the MBS service and the SPS configuration, the mapping between the MBS service and the HPN (HARQ process number) for the SPS configuration, and/or the mapping between the MBS services, short ID(s) if possible, indicated by the network side on the activation DCI or retransmission DCI and/or configured by the RRC message, the network side may re-activate the SPS configuration.

For example, if the SPS configuration is activated for the first MBS service by transmitting an activation DCI indicating the first MBS service, and the network side changes the SPS configuration mapping from the first MBS service to the second MBS service, the network side may reactivate the SPS configuration by transmitting an activation DCI indicating the second MBS service. For example, the reactivation DCI may indicate a short ID associated with the second MBS service or a G-RNTI/TMGI of the second MBS service. Upon receiving the reactivation DCI, the UE may consider that the SPS configuration is remapped to the second MBS service (and not mapped to the first MBS service).

For example, when the SPS configuration is activated for the first MBS service by transmitting an activation DCI indicating the first MBS service, and the network side adds the mapping of the second MBS service to the SPS configuration in addition to the first MBS service, the network side may reactivate the SPS configuration by transmitting an activation DCI indicating the second MBS service. For example, the reactivation DCI may indicate a short ID associated with the second MBS service or a G-RNTI/TMGI of the second MBS service. Upon receiving the reactivation DCI, the UE may consider that the SPS configuration is mapped not only to the first MBS service but also to the second MBS service.

If the PDCCH/PDSCH of the activated SPS configuration collides with other transmission/reception, the high priority of the PDCCH/PDSCH of the activated SPS configuration may ignore other transmission/reception, and other transmission/reception may ignore the low priority of the PDCCH/PDSCH of the activated SPS configuration.

If the PUCCH/PUSCH for the activated SPS configuration collides with other transmission and reception, the high priority of PUCCH/PUSCH of the activated SPS configuration may ignore other transmission/reception, and other transmission/reception may ignore the low priority of PUCCH/PUSCH of the activated SPS configuration.

The priority may be determined as follows.

As option 15-1, activation or retransmission or release DCI with GC-CS-RNTI or CS-RNTI may indicate high priority or low priority for SPS configuration.

As option 15-2, a high priority or a low priority may be set for each SPS configuration by the RRC.

As option 15-3, for each RNTI value used to activate the SPS configuration by the RRC, a high priority or a low priority may be configured. The RNTI may be one of G-RNTI, CS-RNTI and GC-CS-RNTI.

For deactivation of the SPS configuration, the network side may transmit DCI to the UE through the PDCCH. CRC of DCI may be scrambled by GC-CS-RNTI or CS-RNTI. The PDCCH for DCI indicating deactivation of the SPS configuration may be a group common PDCCH or a UE specific PDCCH regardless of whether the SPS configuration is activated by a group common PDCCH or a UE specific PDCCH.

For example, after activating the SPS configuration for the UE group, the network side may deactivate the SPS configuration for only one of the UEs of the group by the UE-specific PDCCH, and the other UE may still activate the SPS configuration.

Deactivation/Release DCI may indicate deactivation/release of SPS configurations using the following options.

As option 17-1, when 'sps-ConfigDeactivationStateList' is provided to the UE, the HARQ process number field value of the DCI format may indicate a corresponding entry for de-scheduling of one or more SPS PDSCH configurations.

As option 17-2, if 'sps-ConfigDeactivationStateList' is not provided to the UE, the value of the HARQ process number field of the DCI format may indicate the configuration of the SPS PDSCH having the same value provided by each of 'ConfiguredGrantConfigIndex' or 'sps-ConfigIndex' or release of the corresponding UL grant type 2 PUSCH.

If the group common DCI for the release of the SPS configuration is not confirmed by the UE, that is, the network side cannot detect the PUCCH TX for confirmation for the release DCI or receives a non-confirmation, it may operate like option 17A or option 17B, which will be described later.

As option 17A, the network side may retransmit the group common DCI indicating the release of the SPS configuration until the release DCI is confirmed by the UE.

As option 17A-1, another UE that has already released the SPS configuration may ignore the retransmitted release DCI. That is, the confirmation for the retransmitted release DCI may not be transmitted.

As option 17A-2, the other UE that has already released the SPS confirmation may re-transmit the confirmation for the retransmitted release DCI to the network side while the SPS configuration is released, without releasing the SPS configuration again.

As option 17B, the network side may provide the UE with a UE-specific DCI for releasing the SPS configuration. DCI in which CRC is scrambled by UE-specific CS-RNTI or C-RNTI may indicate 'sps-ConfigIndex' of group common SPS configuration.

In step S980, The network side may transmit deactivation/release DCI for the activated SPS configuration (e.g., SPS configuration #1) to the UE, and the UE may transmit a HARQ-ACK (or HARQ-NACK) for non-confirmation (or confirmation) of the SPS configuration (e.g., SPS configuration #1) on the PUCCH to the network side.

And, in step S990, when the UE transmits the HARQ-ACK for non-confirmation of the SPS configuration (e.g., SPS configuration #1) on the PUCCH to the network side, the network side may again transmit the deactivation/release DCI for the SPS configuration (e.g., SPS configuration #1) to the UE, and the UE may transmit a HARQ-NACK for confirmation of the SPS configuration (e.g., SPS configuration #1) to the network side on the PUCCH having the TCI state 1.

Specifically, upon receiving the deactivation/release DCI for the activated SPS configuration, the UE may deactivate/release the SPS configuration and all configurations related to the SPS configuration.

If the SPS configuration indicated by the release DCI belongs to one SPS group including other SPS configuration(s), according to the DCI instructing release of the SPS configuration, the UE may release other SPS configuration(s) belonging to the same SPS group.

Alternatively, if the SPS configuration indicated by the release DCI belongs to one SPS group including other SPS configuration(s), upon receiving the DCI indicating release of the SPS configuration, the UE may activate another activated SPS configuration.

General Device to which the Present Disclosure May be Applied

FIG. 10 illustrates a block diagram of a wireless communication device according to an embodiment of the present disclosure.

In reference to FIG. 10, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method for performing uplink transmission by a terminal in a wireless communication system, the method comprising:

receiving information including a plurality of configurations for a group common semi-persistent scheduling (SPS) physical downlink shared channel (PDSCH);

receiving a plurality of group common SPS PDSCHs based on the plurality of configurations; and transmitting information determined by multiplexing Hybrid Automatic Repeat Request-Acknowledgement (HARQ-ACK) information for the plurality of group common SPS PDSCHs on a specific physical uplink control channel (PUCCH) resource, wherein, for the HARQ-ACK information being configured with a specific HARQ-ACK reporting mode, the HARQ-ACK information is multiplexed by transforming to another HARQ-ACK reporting mode, and wherein, based a PUCCH configuration related to the HARQ-ACK information being not configured, the specific PUCCH resource is determined based on another PUCCH configuration related to HARQ-ACK information for unicast SPS transmission.

2. The method of claim 1, wherein the specific HARQ-ACK reporting mode includes that HARQ-ACK information including only ACK value is not transmitted and HARQ-ACK information including only NACK value is transmitted.

3. The method of claim 2, wherein the another HARQ-ACK reporting mode includes generating an ACK value or a NACK value as HARQ-ACK information based on whether a transport block is successfully decoded.

4. The method of claim 1, wherein the specific PUCCH resource is determined based on SPS PUCCH AckNack (AN) related list information included in the another PUCCH configuration and a number of bits of HARQ-ACK information for the plurality of group common SPS PDSCHs.

5. The method of claim 1, wherein, based on the PUCCH configuration related to the HARQ-ACK information being configured, the specific PUCCH resource is determined based on the PUCCH configuration related to the HARQ-ACK information.

6. The method of claim 5, wherein the specific PUCCH resource is determined based on SPS PUCCH AckNack (AN) related list information for multicast included in the PUCCH configuration and a number of bits of HARQ-ACK information for the plurality of group common SPS PDSCHs.

7. The method of claim 1, wherein the multiplexing of HARQ-ACK information for the plurality of group common SPS PDSCHs is performed based on that PUCCH resources carrying HARQ-ACK information for each of the plurality of group common SPS PDSCHs are allocated to the same uplink slot.

8. The method of claim 1, wherein a group-configured scheduling-radio network temporary identifier (G-CS-RNTI) is configured for each of the plurality of configurations, and wherein transmission of the plurality of group common SPS PDSCHs is activated respectively based on a DCI format scrambled with the G-CS-RNTI.

9. The method of claim 1, wherein the specific HARQ-ACK reporting mode is configured based on multicast-related HARQ feedback option information indicating one of two HARQ-ACK reporting modes.

10. The method of claim 1, wherein whether to perform a method of multiplexing the HARQ-ACK information by transforming to the another HARQ-ACK reporting mode is determined based on a comparison between the plurality of group common SPS PDSCHs and a pre-configured threshold value.

11. A user equipment (UE) performing uplink transmission in a wireless communication system, the UE comprising:

at least one transceiver; and at least one processor coupled to the at least one transceiver;

wherein the at least one processor is configured to:

receive information including a plurality of configurations for a group common semi-persistent scheduling (SPS) physical downlink shared channel (PDSCH);

receive a plurality of group common SPS PDSCHs based on the plurality of configurations; and transmit information determined by multiplexing Hybrid Automatic Repeat Request-Acknowledgement (HARQ-ACK) information for the plurality of group common SPS PDSCHs on a specific physical uplink control channel (PUCCH) resource, wherein, for the HARQ-ACK information being configured with a specific HARQ-ACK reporting mode, the HARQ-ACK information is multiplexed by transforming to another HARQ-ACK reporting mode, and wherein, based a PUCCH configuration related to the HARQ-ACK information being not configured, the specific PUCCH resource is determined based on another PUCCH configuration related to HARQ-ACK information for unicast transmission.

12. A base station performing uplink reception in a wireless communication system, the base station comprising:

at least one transceiver; and at least one processor coupled to the at least one transceiver;

wherein the at least one processor is configured to:

transmit information including a plurality of configurations for a group common semi-persistent scheduling (SPS) physical downlink shared channel (PDSCH);

transmit a plurality of group common SPS PDSCHs based on the plurality of configurations; and receive information in which Hybrid Automatic Repeat Request-Acknowledgement (HARQ-ACK) information for the plurality of group common SPS PDSCHs is multiplexed on a specific physical uplink control channel (PUCCH) resource, wherein, for the HARQ-ACK information being configured with a specific HARQ-ACK reporting mode, the HARQ-ACK information is multiplexed by transforming to another HARQ-ACK reporting mode, and wherein, based a PUCCH configuration related to the HARQ-ACK information being not configured, the specific PUCCH resource is determined based on another PUCCH configuration related to HARQ-ACK information for unicast transmission.

* * * * *